United States Patent
Fu et al.

(10) Patent No.: US 12,254,121 B2
(45) Date of Patent: Mar. 18, 2025

(54) DATA PROCESSING METHOD AND APPARATUS, DEVICE, AND COMPUTER-READABLE STORAGE MEDIUM

(71) Applicant: Tencent Technology (Shenzhen) Company Limited, Guangdong (CN)

(72) Inventors: Fangcheng Fu, Shenzhen (CN); Jie Jiang, Shenzhen (CN); Junwei Pan, Shenzhen (CN); Chen Hou, Shenzhen (CN); Huanran Xue, Shenzhen (CN); Yong Cheng, Shenzhen (CN); Yuhong Liu, Shenzhen (CN); Peng Chen, Shenzhen (CN); Yangyu Tao, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 223 days.

(21) Appl. No.: 18/072,313

(22) Filed: Nov. 30, 2022

(65) Prior Publication Data

US 2023/0108682 A1 Apr. 6, 2023

Related U.S. Application Data

(63) Continuation of application No. PCT/CN2022/089798, filed on Apr. 28, 2022.

(30) Foreign Application Priority Data

May 26, 2021 (CN) .......................... 202110576191.6

(51) Int. Cl.
G06F 21/64 (2013.01)
G06F 21/60 (2013.01)

(52) U.S. Cl.
CPC .......... *G06F 21/645* (2013.01); *G06F 21/602* (2013.01)

(58) Field of Classification Search
None
See application file for complete search history.

(56) References Cited

U.S. PATENT DOCUMENTS

2016/0323102 A1* 11/2016 Freudiger ........... G06F 21/6254

FOREIGN PATENT DOCUMENTS

| CN | 107124268 A | 9/2017 |
|----|-------------|--------|
| CN | 111914277 A | 11/2020 |

(Continued)

OTHER PUBLICATIONS

Gahi, Youssef. On the use of homomorphic encryption to secure cloud computing, services, and routing protocols. arXiv: 1508. 05411 [cs.CR]. https://doi.org/10.48550/arXiv.1508.05411 2013. 139 pages. (Year: 2013).*

(Continued)

*Primary Examiner* — Jeffrey R Swearingen
(74) *Attorney, Agent, or Firm* — Sughrue Mion, PLLC

(57) ABSTRACT

A data processing method includes: acquiring a first intersection set, acquiring a second intersection set, calculating an intersection between the first intersection set and the second intersection set to obtain an intersection result set that includes an intersecting portion of the first intersection data and the second intersection data, and obfuscating the intersection result set to obtain an obfuscation set that includes obfuscated data based on data in the second intersection set and an intersection data set based on the intersection result set.

20 Claims, 9 Drawing Sheets

(56) References Cited

FOREIGN PATENT DOCUMENTS

| CN | 111931207 A | 11/2020 |
|---|---|---|
| CN | 112434329 A | 3/2021 |
| CN | 113032840 A | 6/2021 |
| EP | 3 667 647 A1 | 6/2020 |

OTHER PUBLICATIONS

Boshrooyeh et al. PPAD: Privacy Preserving Group-Based Advertising in Online Social Networks. 2018 IFIP Networking Conference (IFIP Networking) and Workshops. May 2018. IEEE. 9 pages. (Year: 2018).*
International Search Report for PCT/CN2022/089798 dated Jul. 27, 2022.
Written Opinion for PCT/CN2022/089798 dated Jul. 27, 2022.

* cited by examiner

DATA PROCESSING METHOD AND APPARATUS, DEVICE, AND COMPUTER-READABLE STORAGE MEDIUM

CROSS-REFERENCE TO RELATED APPLICATIONS

This application is a continuation application of International Application No. PCT/CN2022/089798, filed on Apr. 28, 2022, which claims priority to Chinese Patent Application No. 202110576191.6, filed with the China National Intellectual Property Administration on May 26, 2021, the disclosures of each of which being incorporated by reference herein in their entireties.

FIELD

The disclosure relates to the field of computer technologies, and in particular, to a data processing technology.

BACKGROUND

With the continuous development of the computer technologies, different users can exchange data with each other through a variety of devices. For example, individual users can exchange data with each other through terminal devices such as smart phones and personal computers, and enterprise users can exchange data with each other through devices such as servers. During the data exchange, issues of data privacy and data security are generally involved. In some scenarios, for two users exchanging data, one user may not want to expose data to the other user.

During data exchange between an advertiser and an advertising platform, as an example, the advertiser puts a batch of advertisements to the advertising platform, and the advertising platform promotes the batch of advertisements to promotion users and collects data of the promotion users (e.g., user IDs). When the advertiser counts effective users (e.g., users completing operations such as registration and consumption in the advertiser's store) in a certain period of time, there is a need to acquire the data of the promotion users of the advertising platform for accounting to determine which effective users are converted through the promotion of the advertising platform. However, the advertiser does not want to fully expose data of the effective users to the advertising platform. How to reduce a risk of data leakage during the data exchange has become a hot issue in research.

SUMMARY

According to various embodiments, a data processing method, performed by a computer device, may include acquiring a first intersection set including N pieces of first intersection data, N being a positive integer; acquiring a second intersection set including M pieces of second intersection data, M being a positive integer; calculating an intersection between the first intersection set and the second intersection set to obtain an intersection result set that includes an intersecting portion of the first intersection data and the second intersection data; and obfuscating the intersection result set to obtain an obfuscation set that includes obfuscated data based on data in the second intersection set and an intersection data set based on the intersection result set, the obfuscated data being non-correlated with data in the intersection data set.

According to various embodiments, a data processing apparatus, a computer device, a non-transitory computer-readable storage medium, and a computer program product or a computer program consistent with the foregoing method may also be provided.

DETAILED DESCRIPTION

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figure 1A:
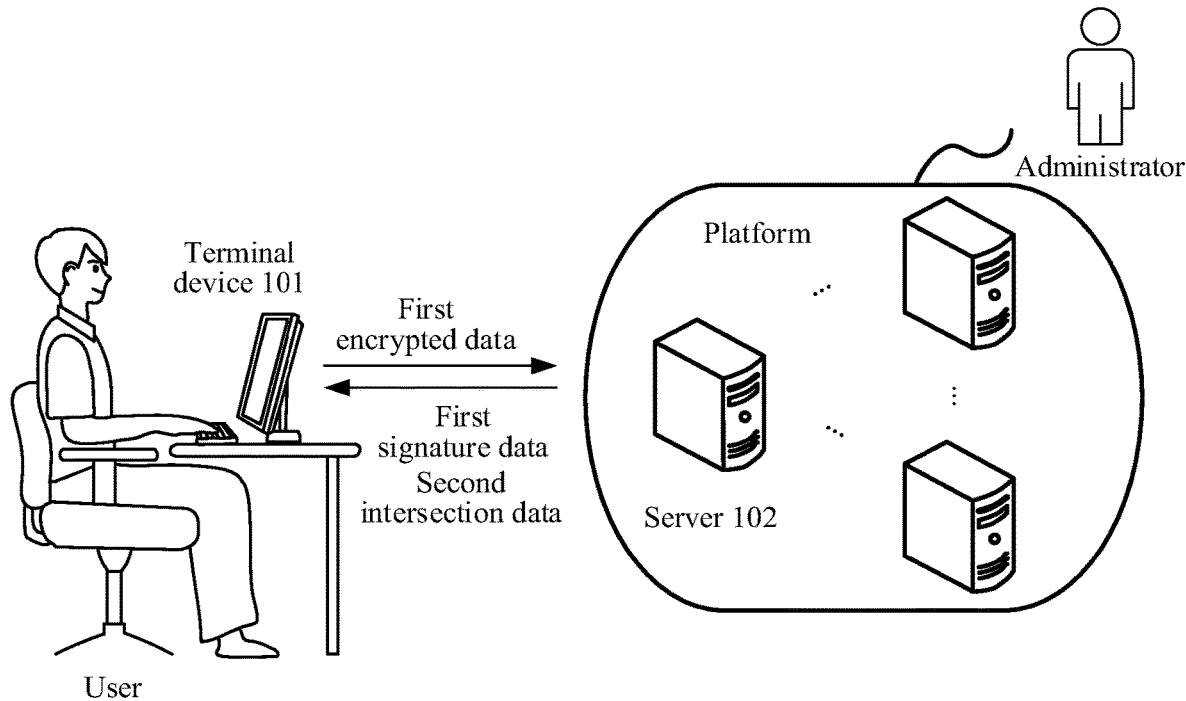
FIG. 1A is a scenario diagram of data processing according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

In some embodiments, the first intersection set and the second intersection set are acquired, and the intersection between the first intersection set and the second intersection set is calculated to obtain the intersection result set. The intersection result set is obfuscated to obtain the obfuscation set. An intersection of two data sets generated by data exchange or in other manners is calculated to meet a requirement of users of one party for intersection calculation. For example, an advertiser user can determine a conversion rate of an advertising platform by calculating an intersection, obfuscate obtained intersection data at the same time, and can also ensure that an obfuscation set finally outputted may not cause a problem of leakage of local data. For example, data that the advertiser feeds back to the advertising platform at the advertising platform's request is obfuscated data, the advertising platform cannot find data originally belonging to the advertiser through the obfuscated data, and the data originally belonging to the advertiser may not be directly exposed, which can significantly reduce, to a large extent, the risk of leakage of data of the party that performs data intersection processing.

Some embodiments are applicable to scenarios in which advertising platforms and advertisers, recruitment platforms and recruitment enterprises have requirements for data exchange and do not want data to be leaked. According to some embodiments, a required data set can be acquired, data information required by users of one party can be automatically determined by calculating an intersection, and data obfuscation can be automatically completed. Even if a finally obtained obfuscation set is directly fed back to users of the other party, there is no risk of leakage of local user data.

In some embodiments, data generated, such as an obfuscated data set, may be stored in a cloud server or a blockchain network as required through an artificial intelligence (AI) cloud service. The so-called AI cloud service is generally also referred to as AI as a Service (AIaaS). This is a mainstream AI platform service at present. Specifically, an AIaaS platform may break down several types of common AI services and provide standalone or packaged services in the cloud. Such a service mode is similar to an AI-themed mall: All developers can access one or more AI services provided by the platform through an application programming interface (API). Some experienced developers can also use an AI framework and AI infrastructure provided by the platform to deploy and maintain their own cloud AI services. In some embodiments, user devices of two parties of data exchange (a first node and a second node) can be assisted by a third-party assistance platform (i.e., an AI cloud service) in completing federated training.

In some embodiments, data exchanged between the first node and the second node can be stored in the blockchain network as required. For example, first encrypted data, first signature data, second intersection data, an obfuscation set, and the like may be stored in the blockchain network to ensure that such data is verifiable and traceable. Then, credibility of the data can be improved.

FIG. 1A is a scenario diagram of data processing according to some embodiments. As shown in FIG. 1A, the scenario diagram includes a terminal device 101 (i.e., a first node) and a server 102 (i.e., a second node). The terminal device 101 is a device used by a user. The user is a guest participant (e.g., an advertiser). One or more terminal devices 101 may be provided. The form of the terminal device 101 is used as an example only. The terminal device 101 may include, but is not limited to, devices such as a smartphone (such as an Android mobile phone or an iOS mobile phone), a tablet computer, a portable computer, and an MID. The terminal device is generally provided with a display apparatus. The display apparatus may be a display, a display screen, a touch screen, or the like, and the touch screen may also be a touch screen, a touch panel, or the like, which is not limited thereto.

The server 102 is a server that provides the user with a service. The server is a host participant (e.g., an advertising platform). The server 102 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. In addition, the server 102 may be a network node in the blockchain network. That is, the terminal device 101 may upload encrypted data to a blockchain, and acquire, from the blockchain, ciphertext data uploaded by a peer end of the data exchange. The terminal device 101 and the server 102 may be directly or indirectly connected in a wired or wireless communication manner. This is not limited herein.

The application scenario shown in FIG. 1A including a terminal device and a server is an example only and is mainly applicable to scenarios in which two parties exchange data. Therefore, in some other embodiments, the application scenario of data processing may also be a scenario in which two terminal devices exchange data. In some embodiments, the application scenario is a scenario in which two servers exchange data. For example, one party is a server of an advertising platform, and the other party is an enterprise server of an advertiser enterprise.

Figure 1B:
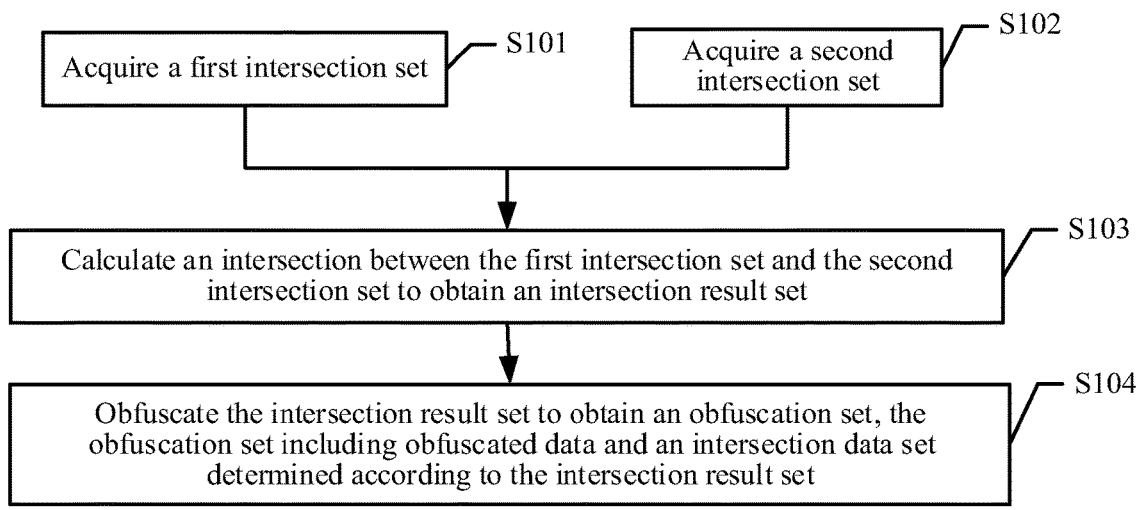
FIG. 1B is a schematic flowchart of a first embodiment of a data processing method according to some embodiments.

FIG. 1B is a schematic flowchart of a data processing method according to some embodiments. The method may be applied to a first node. The first node is a computer device. The computer device may be, for example, the terminal device used by the user described above or a server with a special function. The method includes the following operations.

S101: Acquire a first intersection set, the first intersection set including N first intersection data, N being a positive integer.

S102: Acquire a second intersection set, the second intersection set including M second intersection data, M being a positive integer.

Upon comparison, the first intersection data included in the first intersection set and the second intersection data included in the second intersection set have a same data type but are from different sources. For example, the data types may both be user ID data. However, in terms of the source, one may be from first to-be-processed data in the first node and the other may be from second to-be-processed data in the second node.

Taking an advertising scenario as an example, the first intersection data may be data obtained according to IDs of users that are recorded by the advertiser and have purchased the advertiser's service, for example, ciphertext data obtained through hash mapping or public and private key encryption and decryption, while the second intersection data may be data obtained according to IDs of users that are recorded by the advertising platform and have seen an advertisement put by the advertiser, for example, ciphertext data obtained through hash mapping or public and private key encryption and decryption. Through subsequent calculation of an intersection between the first intersection set and the second intersection set, the advertiser can further analyze, according to intersection result data, an intersection part between the IDs of the users that have seen the advertisement and the IDs of the users that have purchased the advertiser's service. User IDs of the intersection part may be considered as user IDs of the users purchasing the advertiser's related service after seeing the advertisement of the advertising platform. In this way, a conversion rate is calculated according to a quantity of data of the intersection part and a quantity of data in the second intersection set, so as to evaluate the advertising platform accordingly.

S103: Calculate an intersection between the first intersection set and the second intersection set to obtain an intersection result set, the intersection result set including an intersection part between the first intersection data and the second intersection data.

S104: Obfuscate the intersection result set to obtain an obfuscation set, the obfuscation set including obfuscated data and an intersection data set determined according to the intersection result set. The obfuscated data is determined according to data in the second intersection set, and the obfuscated data is non-correlated with data in the intersection data set.

The obfuscated data is determined according to the data in the second intersection set. For example, the obfuscated data may be second intersection data directly selected from the second intersection set. In some embodiments, the selected obfuscated data belongs to the second intersection set. In some embodiments, the obfuscated data is non-correlated with the data in the intersection data set. For example, the obfuscated data does not belong to the intersection result set. Any obfuscated data is different from each piece of data in the intersection result set. In some embodiments, the intersection data set may be the same as the intersection result set. In some embodiments, the intersection data set may also be a subset of the intersection result set.

The obfuscation is intended to ensure that the party determining the intersection part may not notify the other party or a third party of the party's data. After the intersection part is obtained, an obfuscation set is outputted, and the obfuscation set is externally displayed. In addition to the intersection data set, the obfuscation set further includes some obfuscated data. In some embodiments, the obfuscated data may be data selected from the second intersection set, and the obfuscated data does not belong to the intersection result set. In this way, the obfuscation set obtained after the obfuscation is presented to others, without exposing any data recorded on the first node.

For example, through the above operations, after the advertiser determines user IDs channeled from the advertising platform through the intersection part, since the advertiser does not want the advertising platform to learn which users that have seen the advertisement have purchased the service provided by the advertiser, in this case, the advertiser can output an obfuscation set and transmit the obfuscation set to the advertising platform to ensure security of the advertiser's related data, that is, ensure that the advertiser's data may not be leaked. The above effect can be achieved because data of the intersection part included in the intersection data set in the obfuscation set is in the second node, and the part of the obfuscated data also belongs to the second node. In this way, the second node cannot distinguish which part of the data in the obfuscation set belongs to the intersection data and which part is the obfuscated data. At the same time, the advertising platform can also obtain partial information through the obfuscation set to facilitate other processing. For example, a user of the advertising platform can perform federated training based on the obfuscation set.

In some embodiments, the N pieces of first intersection data included in the first intersection set may be original data of the advertiser, such as original IDs of users that are recorded by the advertiser and have purchased the advertiser's service, and the M pieces of second intersection data included in the second intersection set may be such as original data of the advertising platform, for example, original IDs of users that are recorded by the advertising platform and have been a product service advertisement of the advertiser. Processing is performed on a device of the advertiser. The advertiser can know data of the advertising platform, but the advertiser may return an obfuscation set obtained after obfuscation to the advertising platform, and the advertising platform cannot have access to the original data of the advertiser based on the obfuscation set, which ensures that the advertiser's information may not be leaked to the advertising platform.

In some embodiments, the N pieces of first intersection data included in the first intersection set may be ciphertext data after first original data is processed through a first ciphertext processing rule, and the M pieces of second intersection data included in the second intersection set may be ciphertext data after second original data is processed through a second ciphertext processing rule. If the first original data and the second original data are the same, the ciphertext data obtained after the first original data is processed through the first ciphertext processing rule and the ciphertext data obtained after the second original data is processed through the second ciphertext processing rule are same data. If the first original data and the second original data are different, the ciphertext data obtained after the first original data is processed through the first ciphertext processing rule and the ciphertext data obtained after the second original data is processed through the second ciphertext processing rule are different data. The first original data may be, for example, data such as the original IDs of the users that are recorded by the advertiser and have purchased the advertiser's service, and the second original data may be, for example, data such as the original IDs of the users that are recorded by the advertising platform and have been the product service advertisement of the advertiser.

The first intersection set includes data of the corresponding user after ciphertext processing, and the second intersection set also includes the data of the corresponding user after ciphertext processing. Therefore, in some embodiments, two parties of data exchange cannot obtain original data of the opposite side. For example, since the ciphertext data received by the advertiser is ciphertext data after the advertising platform processes the second original data through the second ciphertext processing rule, it can ensure that the advertising platform's information (i.e., the second original data) may not be leaked to the advertiser, and the advertiser cannot perform decryption. At the same time, after the obfuscation set obtained after obfuscation is returned to the advertising platform, the advertising platform does not know which information in the obfuscation set is the advertiser's information (the first original data), which also ensures that the advertiser's information may not be leaked to the advertising platform. In other words, if the first intersection data is the ciphertext data obtained after the first original data is processed through the first ciphertext processing rule and the second intersection data is the ciphertext data obtained after the second original data is processed through the second ciphertext processing rule, the advertiser can determine intersection data when both parties of exchange do not know the original data of the opposite side, the advertiser cannot know the raw data of the advertising platform, and the advertising platform neither has access to the raw data of the advertiser nor can determine the intersection data from the obfuscation set.

In some embodiments, the first intersection set and the second intersection set are acquired, and the intersection between the first intersection set and the second intersection set is calculated to obtain the intersection result set. The intersection result set is obfuscated to obtain the obfuscation set. An intersection of two data sets generated by data exchange or in other manners is calculated to meet a requirement of users of one party for intersection calculation. For example, an advertiser user can determine a conversion rate of an advertising platform by calculating an intersection, obfuscate obtained intersection data at the same time, and can also ensure that an obfuscation set finally outputted may not cause a problem of leakage of local data. For example, data that the advertiser feeds back to the advertising platform at the advertising platform's request may not directly expose original data belonging to the advertiser.

One situation of a data processing process according to some embodiments is described below with reference to FIG. 2 and FIG. 3.

Figure 2:
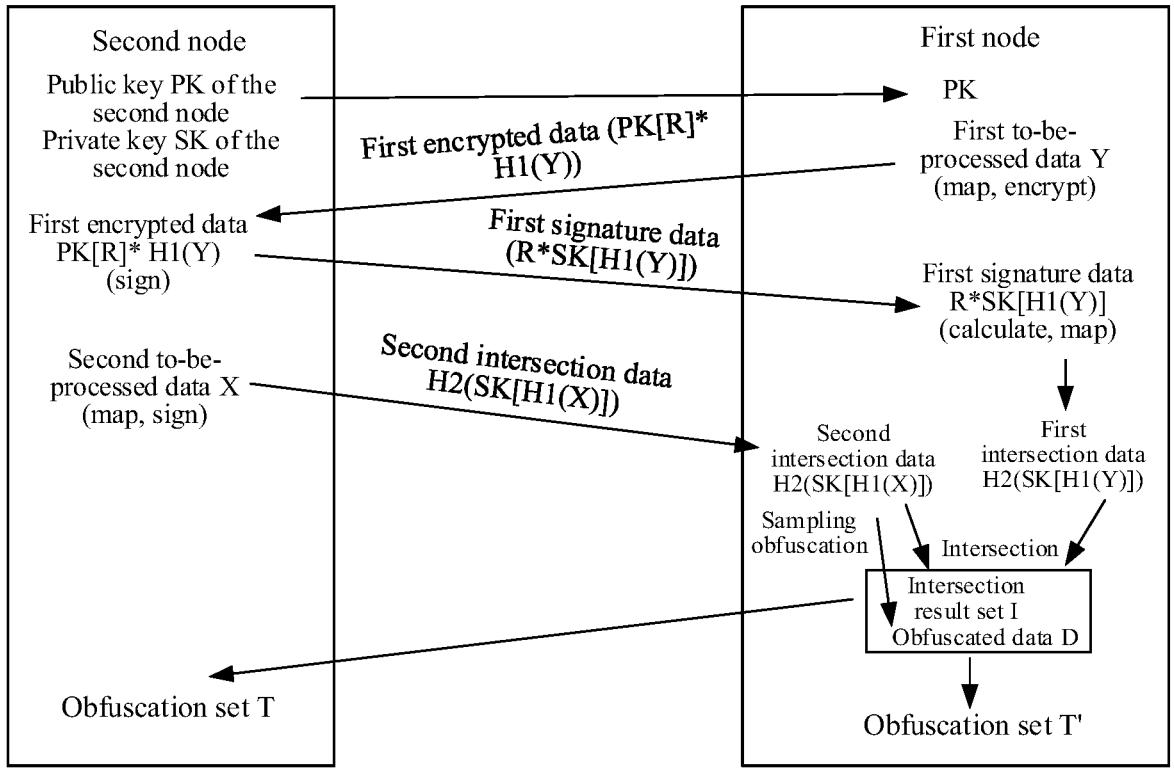
FIG. 2 is a schematic architectural diagram of data processing according to some embodiments.

FIG. 2 is an architectural diagram of data processing according to some embodiments. As shown in FIG. 2, a data processing flow mainly includes the following operations:

(1) A first node acquires first signature data, the first signature data (R*SK[H1(Y)]) is data obtained after first encrypted data (PK[R]*H1(Y)) is signed using a private key (SK) of a second node, and the first encrypted data (PK[R]*H1(Y)) is data obtained after the first node encrypts first to-be-processed data (Y). For example, assuming that the first to-be-processed data is Y, the first node maps the first to-be-processed data through a first mapping rule (H1) to obtain first intermediate data H1(Y), uses a public key of the second node to encrypt an original random number R correlated with the first to-be-processed data to obtain an encrypted random number PK[R], and obtains first encrypted data PK[R]*H1(Y) by calculation (e.g., modular operation) according to the first intermediate data H1(Y) and the encrypted random number PK[R]. The second node, after receiving the first encrypted data PK[R]*H1(Y), uses the private key SK of the second node to sign the first encrypted data PK[R]*H1(Y) to obtain the first signature data. Specifically, the first signature data=SK[PK[R]*H1(Y)]=R*SK[H1(Y)].

(2) The first node calculates first intersection data corresponding to the first signature data according to the first signature data. Specifically, the first node obtains original signature data by calculation according to the original random number R and the first signature data R*SK[H1(Y)], the original signature data matching data obtained after the first intermediate data is signed using the private key of the second node, and then uses a second mapping rule to map the original signature data to obtain the first intersection data corresponding to the first signature data. For example, assuming that the original random number is R, the first signature data is R*SK[H1(Y)], and the second mapping rule is H(X), the original signature data=MI(R*SK[H1(Y)], R)=SK[H1(Y)], where MI( ) is a modular inverse function, indicating modular inversion between R*SK[H1(Y)] and R. The original signature data is mapped by using the second mapping rule, to obtain the first intersection data=H2(SK[H1(Y)]).

(3) The first node acquires second intersection data. The second intersection data (H2(SK[H1(X)])) is data obtained after second signature data (SK[H1(X)]) is mapped, the second signature data (SK[H1(X)]) is data obtained after mapped data (H1(X)) is signed using the private key (SK) of the second node, and the mapped data (H1(X)) is data obtained after second to-be-processed data (X) is mapped. For example, assuming that the second to-be-processed data is X, the second node maps the second to-be-processed data through the first mapping rule (H1) to obtain the mapped data H1(X), uses the private key SK of the second node to sign the mapped data to obtain the second signature data=SK[H1(X)], and then maps the second signature data through the second mapping rule (H2) to obtain the second intersection data=H2(SK[H1(X)]).

(4) The first node calculates an intersection between the first intersection data and the second intersection data to obtain an intersection result set. Specifically, the first intersection data (H2(SK[H1(Y)]) is added to the first intersection set. The first intersection set includes N pieces of first intersection data, N being a positive integer. The second intersection data (H2(SK[H1(X)])) is added to the second intersection set. The second intersection set includes M pieces of second intersection data, M being a positive integer. An intersection between the first intersection set and the second intersection set is calculated to obtain the intersection result set. Further, the first node acquires an obfuscation parameter, and selects P pieces of obfuscated data from the second intersection set according to the obfuscation parameter. The P pieces of obfuscated data do not belong to the intersection result set. P is a positive integer. The P pieces of obfuscated data are added to the intersection result set to obtain the obfuscation set. Furthermore, the first node generates a first training data set according to the obfuscation set, and the second node generates a second training data set according to the obfuscation set, and performs federated training on an initial model based on the first training data set and the second training data set to obtain a trained conversion model.

Figure 3:
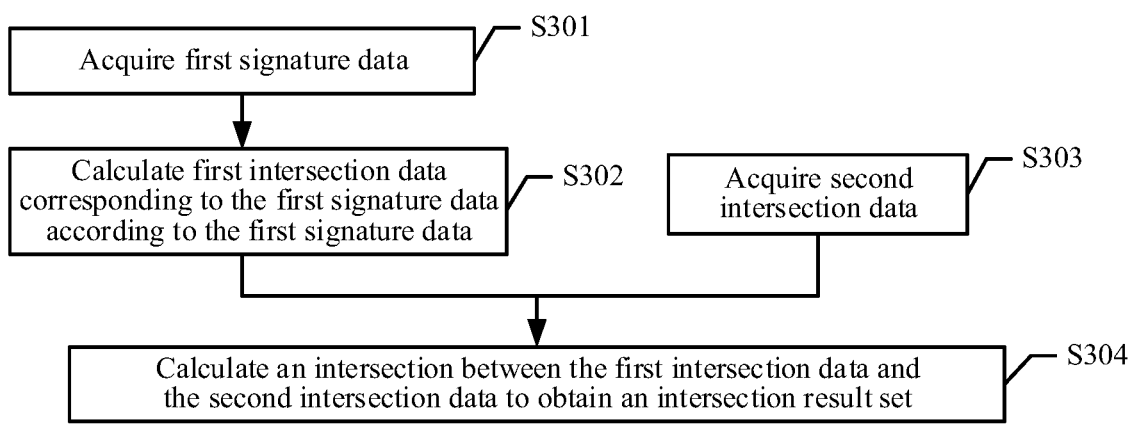
FIG. 3 is a schematic flowchart of a data processing method according to some embodiments.

FIG. 3 is a schematic flowchart of a data processing method according to some embodiments. The method may be applied to a first node. The first node is a computer device. The computer device may be, for example, the terminal device used by the user described above or a server with a special function. The method includes the following operation.

S301: Acquire first signature data. The first signature data (R*SK[H1(Y)]) is data obtained after first encrypted data (PK[R]*H1(Y)) is signed using a private key (SK) of a second node, and the first encrypted data (PK[R]*H1(Y)) is data obtained after the first node encrypts first to-be-processed data (Y).

The first to-be-processed data may be private data of the first node. In some embodiments, the first to-be-processed data is user ID data collected by the first node. Each piece of user ID data is taken as a piece of first to-be-processed data.

In some embodiments, the first node negotiates with the second node to determine a first mapping rule (H1) and a second mapping rule (H2). The first mapping rule and the second mapping rule are irreversible mapping rules (that is, rules that cannot invert original data from results and mapping rules), which may specifically include, but are not limited to, a hash algorithm (e.g., SHA256).

In some embodiments, the first node generates an original random number correlated with the first to-be-processed data, and uses a first mapping rule to map the first to-be-processed data to obtain first intermediate data (H1(Y)). It may be understood that a correlation between the first intermediate data and the original random number may be determined according to a correlation between the first to-be-processed data and the original random number. For example, the original random number correlated with first to-be-processed data D1 is R1, and the original random number correlated with first to-be-processed data D2 is R2. D1 and D2 are respectively mapped through the first mapping rule to obtain first intermediate data H1(D1) and first intermediate data H1(D2). The original random number correlated with H1(D1) is R1, and the original random number correlated with H1(D2) is R2. Since the first intermediate data is obtained by using an irreversible mapping rule to map the first to-be-processed data, other nodes except the first node cannot obtain the first to-be-processed data by inversion according to the first intermediate data.

Further, the first node acquires a public key of the second node. The public key of the second node is generated using an asymmetric key encryption rule. For example, the second node generates the public key and the private key of the second node through an RSA algorithm. The first node, after acquiring a public key of the second node, encrypts an original random number correlated with the first intermediate data by using the public key of the second node, to obtain an encrypted random number corresponding to the first intermediate data; and generates (calculates) the first encrypted data according to the first intermediate data and the encrypted random number corresponding to the first intermediate data. For example, assuming that the public key of the second node is PK, the first intermediate data is H1(D1), and the original random number correlated with the first intermediate data is R1, the first node encrypts the original random number R1 correlated with the first intermediate data by using the public key PK of the second node, to obtain the encrypted random number PK[R1] corresponding to the first intermediate data H1(D1), and performs modular operation according to the first intermediate data H1(D1) and the encrypted random number PK[R1] to obtain the first encrypted data PK[R1]*H1(D1).

The second node, after receiving the first encrypted data transmitted by the first node, uses the private key of the second node to sign the first encrypted data to obtain the first signature data, and transmits the first signature data to the first node. For example, assuming that the private key of the second node is SK and the first encrypted data is PK[R1]*H1(D1), the first signature data is: SK[PK[R1]*H1(D1)]=R1*SK[H1(D1)]. It may be understood that original signature data SK[H1(D1)] is kept secret from the first node, and the first node can determine a correlation between the first to-be-processed data D1 and the original signature data SK[H1(D1)] according to a correlation between the original random number R1 and the first to-be-processed data D1.

S302: Calculate first intersection data corresponding to the first signature data according to the first signature data.

In some embodiments, the first node calculates original signature data included in the first signature data (R*SK[H1(Y)]) according to the original random number and the first signature data. For example, assuming that the original random number is R1 and the first signature data is R1*SK[H1(D1)], the original signature data is: MI(R1*SK[H1(D1)], R1)=SK[H1(D1)], where MI( ) is a modular inverse function, indicating modular inversion between R1*SK[H1(D1)] and R1.

Further, the first node maps the original signature data by using a second mapping rule, to obtain the first intersection data corresponding to the first signature data. For example, assuming that a function corresponding to the second mapping rule is H2(X) and the original signature data is SK[H1(D1)], the first intersection data corresponding to the first signature data obtained by the first node by mapping the original signature data by using the second mapping rule is: H2(SK[H1(D1)]).

S303: Acquire second intersection data. The second intersection data (H2(SK[H1(X)])) is data obtained after second signature data (SK[H1(X)]) is mapped, the second signature data (SK[H1(X)]) is data obtained after mapped data (H1(X)) is signed using the private key (SK) of the second node, and the mapped data (H1(X)) is data obtained after second to-be-processed data (X) is mapped.

The second to-be-processed data may be private data of the second node. In some embodiments, the second to-be-processed data is user ID data collected by the second node. Each piece of user ID data is taken as a piece of second to-be-processed data.

In some embodiments, the second node uses a first mapping rule to map the second to-be-processed data to obtain the mapped data. Since the mapped data is obtained by using an irreversible mapping rule to map the second to-be-processed data, other nodes except the second node cannot obtain the second to-be-processed data by inversion according to the first intermediate data. Further, the mapped data is signed by using the private key of the second node, to obtain the second signature data. For example, assuming that the mapped data is H1(D2) and the private key of the second node is SK, the second signature data obtained by signing the mapped data by using the private key of the second node is: SK[H1(D2)]. Furthermore, the second signature data is mapped by using the second mapping rule, to obtain the second intersection data. For example, assuming that the second signature data is: SK[H1(D2)] and the function corresponding to the second mapping rule is H2(X), the second intersection data obtained by mapping the second signature data by using the second mapping rule is: H2(SK[H1(D2)]).

S304: Calculate an intersection between the first intersection data and the second intersection data to obtain an intersection result set. The intersection result set includes an intersection part between the first intersection data (H2(SK[H1(Y)])) and the second intersection data (H2(SK[H1(X)])).

In some embodiments, if the first intersection data and the second intersection data intersect (for example, the first intersection data and the second intersection data are the same), it indicates that first to-be-processed data corresponding to the first intersection data matches second to-be-processed data corresponding to the second intersection data, and the first node adds the first intersection data to the intersection result set.

In some embodiments, the first intersection data (H2(SK[H1(Y)]) is added to the first intersection set. The first intersection set includes N pieces of first intersection data, N being a positive integer. The second intersection data (H2(SK[H1(X)])) is added to the second intersection set. The second intersection set includes M pieces of second intersection data, M being a positive integer. An intersection between the first intersection set and the second intersection set is calculated to obtain the intersection result set.

In some embodiments, the intersection result set is obtained by private set intersection (PSI). As can be seen, on the premise of ensuring data privacy (the first node cannot obtain the second to-be-processed data in the second node according to the second intersection data, and the second node cannot obtain the first to-be-processed data in the first node according to the first encrypted data), Q pieces of first to-be-processed data matching M pieces of second to-be-processed data are determined from the N pieces of first to-be-processed data according to the M pieces of second to-be-processed data, where Q is a positive integer, and Q is less than or equal to N.

S305: Obfuscate the intersection result set to obtain an obfuscation set, the obfuscation set including obfuscated data and an intersection data set determined according to the intersection result set. The obfuscated data is determined according to data in the second intersection set, and the obfuscated data is non-correlated with data in the intersection data set.

The obfuscated data is determined according to the data in the second intersection set. For example, the obfuscated data may be second intersection data selected from the second intersection set. In some embodiments, the selected obfuscated data belongs to the second intersection set. In some embodiments, the obfuscated data is non-correlated with the data in the intersection data set. For example, the obfuscated data does not belong to the intersection result set. Any obfuscated data is different from each data in the intersection result set. In some embodiments, the intersection data set is the same as the intersection result set.

The first node obfuscates an intersection result set I by using obfuscated data D, and then transmits an obtained obfuscation set T to the second node to facilitate the second node to perform corresponding processing. In some possible embodiments, the intersection result set I obtained by calculating an intersection may also be directly transmitted to the second node. In some embodiments, the first node obtains a correlated obfuscation set T' corresponding to the obfuscation set T according to the obfuscated data D and the intersection result set I. In the obfuscation set T and the correlated obfuscation set T', in first to-be-processed data Y recorded by the first node and second to-be-processed data X recorded by the second node, a same sample ID (that is, the sample ID belongs to both the first to-be-processed data Y and the second to-be-processed data X) has a same position in the obfuscation set T and the correlated obfuscation set T' (specifically refer to a training sample (T) and a positive-negative sample (T') shown in FIG. 5), so as to facilitate subsequent further data processing (e.g., federated training).

In some embodiments, S305 may specifically include selecting P pieces of second intersection data from the second intersection set as the obfuscated data according to an obfuscation parameter, the obfuscated data not belonging to the intersection result set, P being a positive integer. Finally, the obfuscated data is added to the intersection result set to obtain the obfuscation set.

The first node acquires an obfuscation parameter. The obfuscation parameter may be generated by the first node according to user setting or negotiated by the first node and the second node. The obfuscation parameter may be either a proportional value (e.g., 10% of the second intersection data) or a specific quantity value (e.g., 100 pieces of second intersection data). The first node obfuscates the intersection result set according to the obfuscation parameter and the second intersection set to obtain the obfuscation set. In some embodiments, the first node selects P pieces of obfuscated data from the second intersection set according to the obfuscation parameter. The P pieces of obfuscated data do not belong to the intersection result set. P is a positive integer. The P pieces of obfuscated data are added to the intersection result set to obtain the obfuscation set (i.e., ensure that the obfuscation set includes at least one piece of second intersection data that does not belong to the intersection result set). For example, assuming that the obfuscation parameter is 20% and a quantity of the second intersection data in the second intersection set is 100, the first node, after obtaining the intersection result set, randomly selects 20 pieces of second intersection data from the second intersection data not belonging to the intersection result set and adds such second intersection data to the intersection result set.

Furthermore, the first node generates a first training data set according to the obfuscation set, and the second node generates a second training data set according to the obfuscation set and ensures that positive samples in the first training data set and the second training data set (i.e., data in the intersection result set) are aligned (i.e., a same positive sample has a same position in the first training data set and the second training data set).

In some embodiments, a third-party collaboration platform transmits a public key to the first node and the second node for encrypting the first training data set and the second training data set. Intermediate results used for calculating gradients are exchanged between the first node and the second node in ciphertext. The first node and the second node respectively perform calculation based on encrypted gradient values. At the same time, the first node calculates losses according to the intersection result set and summarizes results to the third-party collaboration platform. The third-party collaboration platform calculates a total gradient value by summarizing the results and decrypts the total gradient value, and transmits a decrypted gradient back to the first node and the second node respectively. The first node and the second node update parameters of respective initial models according to the gradient to obtain a trained conversion model. The process of federated training depends on the third-party collaboration platform in some scenarios, but may be independent of the third-party collaboration platform in some other scenarios. Two parties of calculation protect the data through a homomorphic encryption algorithm and update model parameters in a ciphertext space.

Assuming that the first to-be-processed data and the second to-be-processed data are ID data, it can be seen from operation S301 to operation S304:

Two participants participating in the calculation are: the first node (guest participant) and the second node (host participant). The first node is the party obtaining an exact intersection, and the second node is the party obtaining a superset of intersection (i.e., the obfuscation set). Some ID data in the obfuscation set is local IDs from the second node (i.e., the second to-be-processed data) and local IDs not belonging to the first node (i.e., the first to-be-processed data).

In a protocol preparation phase, the two parties exchange necessary information (e.g., negotiate an encryption rule), and determine an obfuscation parameter (a dummy sample proportion D, "dummy sample" refers to an ID that belongs to the second node but does not belong to the intersection result set, which is used for protecting IDs in the intersection result set).

In a protocol calculation phase, through a series of protection mechanisms (which use a key to encrypt data through the encryption rule), the two parties may map sample plaintext IDs to an intersection space (the IDs are mapped to the ciphertext space through a series of security processing, and ID plaintext cannot be cracked by inversion or database collision) to protect the IDs, and the ID plaintext cannot be cracked by either party by inversion or database collision. The second node transmits intersection space IDs (i.e., second intersection data) to the first node, and the first node completes intersection calculation of ciphertext (the above method includes, but is not limited to, PSI protocols based on blind signature, Diffie-Hellman, or oblivious transfer, and any method that encrypts IDs and calculates an intersection on one party may be applicable). Then, according to the obfuscation parameter, the first node extracts part of the second intersection data transmitted by the second node as obfuscated data (dummy IDs) which is into the intersection result set to obtain the obfuscation set, and transmits the obfuscation set to the second node.

All sample IDs in the obfuscation set obtained by the second node are all from a local set of the second node, and an obfuscation intersection is a superset of an actual intersection. The second node cannot learn from the obfuscation set which IDs belong to a local set of the first node (that is, which IDs belong to the actual intersection).

The obfuscation set obtained by the first node is formed by all real IDs of the actual intersection and part of the intersection space IDs of the second node (i.e., the second intersection data). The first node may learn, by comparing local ID sets, which IDs belong to the actual intersection. Since IDs (i.e., dummy IDs) in the obfuscation set that do not belong to the intersection result set are encrypted, the first node cannot obtain real values of such IDs. In scenarios such as an advertising service scenario, the first node as an advertiser can learn, according to the actual intersection, which IDs (such as those completing transactions in the advertiser's store) have appeared in the second node, such as a target advertising platform. The advertiser may consider that IDs of the intersection part select commodities in the store and complete the transactions after seeing an advertisement pushed by the target advertising platform, and the first node can calculate parameters such as a conversion rate of the advertisement accordingly.

In some embodiments, the first node acquires the first signature data; the first signature data being data obtained after first encrypted data is signed using the private key of the second node; calculates the first intersection data corresponding to the first signature data according to the first signature data; and acquires the second intersection data, the second intersection data being data obtained after the second to-be-processed data is encrypted, and calculates the intersection between the first intersection data and the second intersection data to obtain the intersection result set. As can be seen, the calculation of the intersection based on the first intersection data and the second intersection data obtained after encryption can better improve privacy and security of data exchange. An intersection of two data sets generated by data exchange or in other manners is calculated to meet a requirement of users of one party for intersection calculation. For example, an advertiser user can determine a conversion rate of an advertising platform by calculating an intersection, obfuscate obtained intersection data at the same time, and can also ensure that an obfuscation set finally outputted may not cause a problem of leakage of local data. For example, the advertiser feeds data back to the advertising platform at the advertising platform's request, which may not directly expose data originally belonging to the advertiser.

Figure 4:
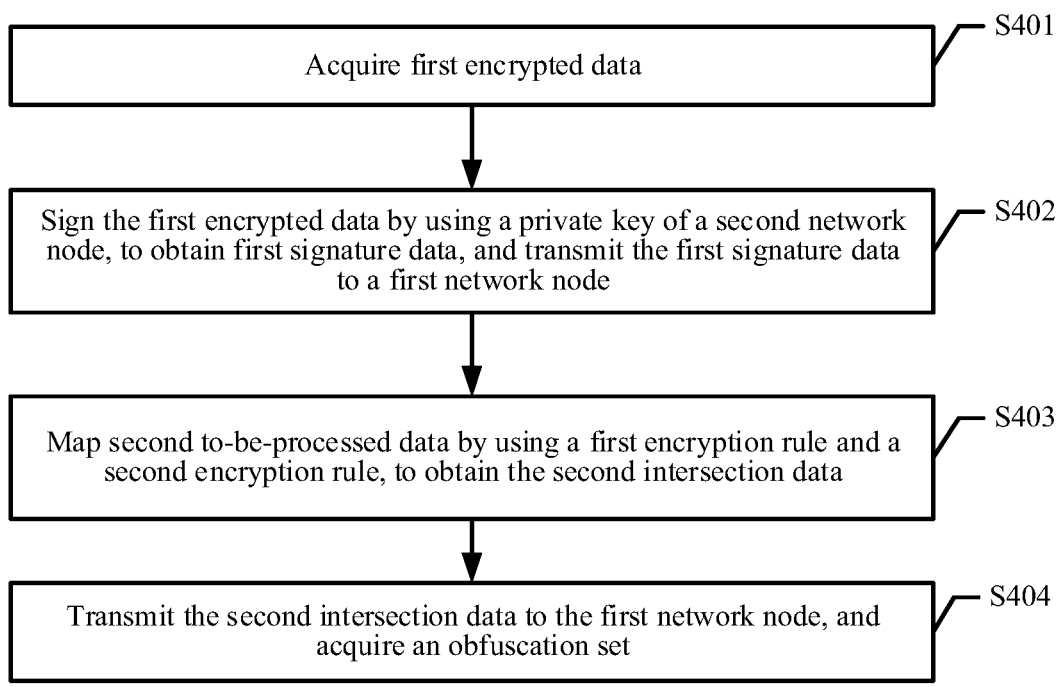
FIG. 4 is a schematic flowchart of a data processing method according to some embodiments.

FIG. 4 is a flowchart of a data processing method according to some embodiments. The method may be applicable to a second node. The second node may be a computer device. The computer device may be, for example, an intelligent terminal or a server, for example, the server 102 shown in FIG. 1A. The method according to some embodiments may include the following operation.

S401: Acquire first encrypted data. The first encrypted data (PK[R]*H1(Y)) is data obtained after first to-be-processed data (Y) is encrypted using an encrypted random number and a first mapping rule.

The encrypted random number is obtained by encrypting an initial random number by using a public key of the second node. The initial random number is generated according to the first to-be-processed data. Each piece of first to-be-processed data is correlated with an initial random number. The first mapping rule is negotiated by a first node and the second node. The first mapping rule is an irreversible mapping rule (original data cannot be inverted from results and mapping rules), which may specifically include, but is not limited to, a hash algorithm (e.g., SHA256). The first to-be-processed data may be private data of the first node. In some embodiments, the first to-be-processed data is user ID data collected by the first node. Each piece of user ID data is taken as a piece of first to-be-processed data.

S402: Sign the first encrypted data by using a private key of the second node, to obtain first signature data, and transmit the first signature data to the first node. The second node, after receiving the first encrypted data transmitted by the first node, uses the private key of the second node to sign the first encrypted data to obtain the first signature data, and transmits the first signature data to the first node. For example, assuming that the private key of the second node is SK and the first encrypted data is PK[R1]*H1(D1), the first signature data is: SK[PK[R1]*H1(D1)]=R1*SK[H1(D1)]. It may be understood that original signature data SK[H1(D1)] is kept secret from the first node, and the first node can determine a correlation between the first to-be-processed data D1 and the original signature data SK[H1(D1)] according to a correlation between the original random number R1 and the first to-be-processed data D1.

S403: Map second to-be-processed data by using a first mapping rule and a second mapping rule, to obtain second intersection data.

The second to-be-processed data may be private data of the second node. In some embodiments, the second to-be-processed data is user ID data collected by the second node. Each piece of user ID data is taken as a piece of second to-be-processed data.

In some embodiments, the second node uses a first mapping rule to map the second to-be-processed data to obtain mapped data. Since the mapped data is obtained by using an irreversible mapping rule to map the second to-be-processed data, other nodes except the second node cannot obtain the second to-be-processed data by inversion according to the first intermediate data.

Further, the mapped data is signed by using the private key of the second node, to obtain second signature data. For example, assuming that the mapped data is H1(D2) and the private key of the second node is SK, the second signature data obtained by signing the mapped data by using the private key of the second node is: SK[H1(D2)].

Furthermore, the second signature data is mapped by using the second mapping rule, to obtain the second intersection data. For example, assuming that the second signature data is: SK[H1(D2)] and the function corresponding to the second mapping rule is H2(X), the second intersection data obtained by mapping the second signature data by using the second mapping rule is: H2(SK[H1(D2)]).

S404: Transmit the second intersection data to the first node, and acquire an obfuscation set.

The obfuscation set is a set obtained after obfuscated data is added to an intersection result set. The intersection result set is a set obtained after an intersection between the first intersection data and the second intersection data is calculated. The obfuscated data is (randomly) extracted from the second intersection data according to an obfuscation parameter.

Further, the first node generates a first training data set according to the obfuscation set, and the second node generates a second training data set according to the obfuscation set and ensures that positive samples in the first training data set and the second training data set (i.e., data in the intersection result set) are aligned (i.e., a same positive sample has a same position in the first training data set and the second training data set).

In some embodiments, a third-party collaboration platform transmits a public key to the first node and the second node for encrypting the first training data set and the second training data set. Intermediate results used for calculating gradients are exchanged between the first node and the second node in ciphertext. The first node and the second node respectively perform calculation based on encrypted gradient values. At the same time, the first node calculates losses according to the intersection result set and summarizes results to the third-party collaboration platform. The third-party collaboration platform calculates a total gradient value by summarizing the results and decrypts the total gradient value, and transmits a decrypted gradient back to the first node and the second node respectively. The first node and the second node update parameters of respective initial models according to the gradient to obtain a trained conversion model.

In some embodiments, the second node acquires the first encrypted data, the first encrypted data being data obtained after the first to-be-processed data is encrypted, signs the first encrypted data by using the private key of the second node, to obtain the first signature data, transmits the first signature data to the first node, encrypts the second to-be-processed data by using the first mapping rule and the second mapping rule, to obtain the second intersection data, transmits the second intersection data to the first node, and acquires the obfuscation set. As can be seen, during the data exchange, exchanged data is encrypted data, the two parties cannot directly acquire plaintext data, and during data transmission, the data may not be leaked due to illegal interception of the data, which can better ensure privacy and security of the data. At the same time, for the first node, the obfuscated data is finally outputted, which also ensures that the data of the first node may not be leaked and further ensures the privacy of the data on the first node.

Figure 5:
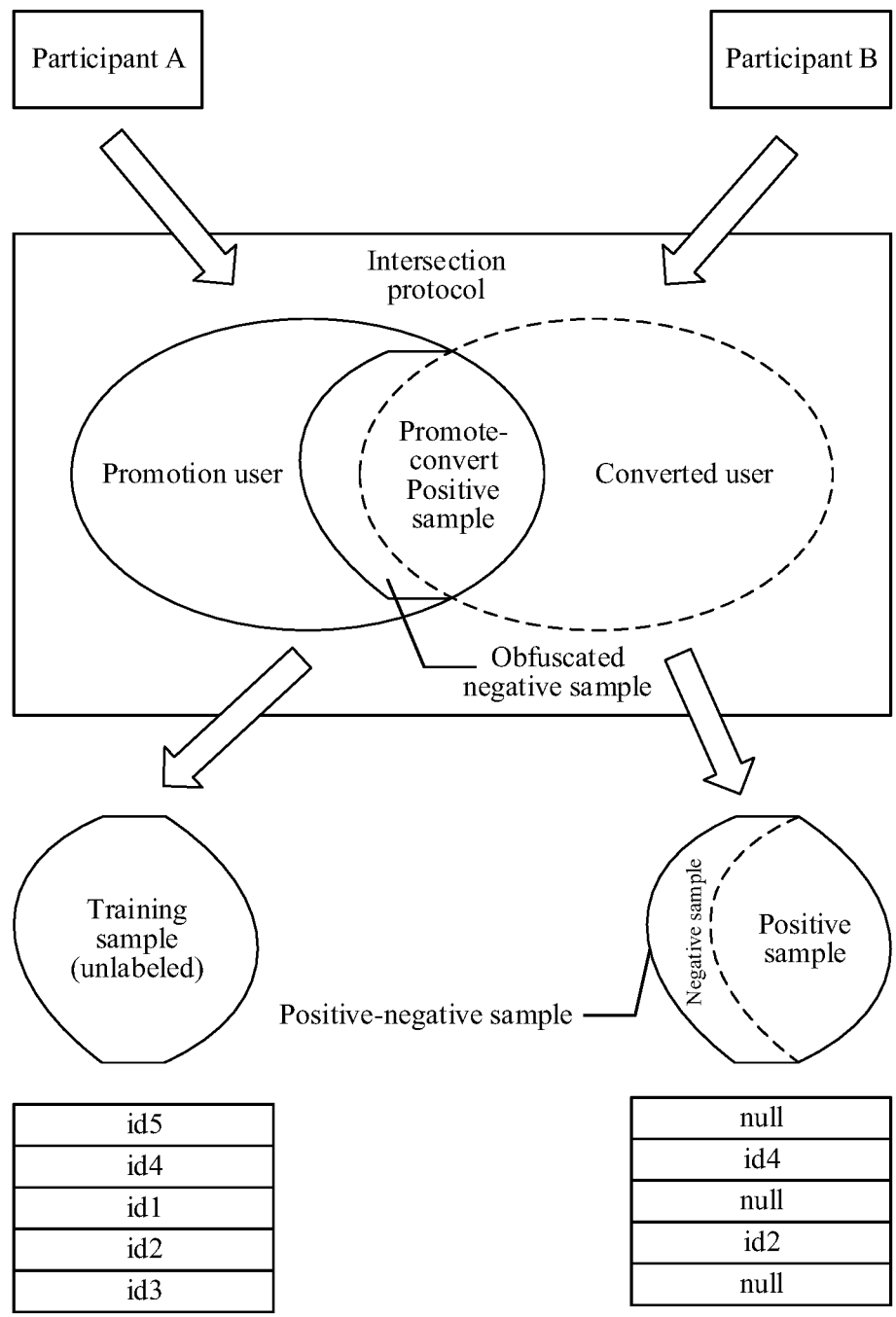
FIG. 5 is a schematic architectural diagram of an application scenario according to some embodiments.

FIG. 5 is an architectural diagram of an application scenario according some embodiments. As shown in FIG. 5, a relevant requirement for data exchange exists between a participant A and a participant B, and the participant B (such as an advertiser) does not want a local ID set to be acquired by the participant A (such as an advertising platform). For the participant B, since local sample IDs on the corresponding first node are highly private data (such as user ID data), even IDs belonging to the intersection (user IDs converted from the advertising platform) cannot be acquired by the second node corresponding to the participant A. In some embodiments, a mapping function from a plaintext space to an intersection space is H2(SK[H1(ID)]), where H1 and H2 are hash functions. A data processing (PSI protocol) flow is described below with reference to FIG. 2 by taking the scenario shown in FIG. 5 as an example.

1) In the protocol preparation phase, the second node (participant A or host party) generates asymmetric keys (PK, SK) and shares PK with the first node (participant B or guest party). The two parties negotiate two data mapping rules, namely the hash functions H1 and H2 (without loss of generality, the asymmetric keys may be RSA keys; the hash functions may be SHA256). Then, the first node and the second node negotiate an obfuscation parameter (a dummy sample proportion D). Depending on different application scenarios, the obfuscation parameter may also be determined by the first node and kept secret from the second node.

2) It is assumed that the second to-be-processed data in the second node (e.g., user IDs of users to whom the advertising platform puts an advertisement) is X and the first to-be-processed data in the first node (e.g., user IDs actually entering the advertiser's store, user IDs completing account registration in the advertiser's store, and even user IDs consuming and completing transactions in the advertiser's store, which may specifically be part or all of such three or more user IDs according to an actual situation) is Y. The first node and the second node respectively calculate hash values of the local sample IDs by using the first mapping rule (H1), to obtain H1(X) and H1(Y).

3) The first node generates an original random number R for each local ID, and after encrypting the original random number R by using the public key (PK) of the second node, performs calculation (such as modular operation) according to the original random number and the first intermediate data H1(Y) to obtain first encrypted data (blinded IDs): PK[R]*H1(Y), and the first node transmits at least one piece of the first encrypted data to the second node.

4) The second node receives the first encrypted data transmitted by the first node, uses the private key SK of the second node to sign each piece of the first encrypted data (blinded IDs) to obtain first signature data: SK[PK[R]*H1(Y)]=R*SK[H1(Y)] (ciphertextPK[R] signature is equivalent to decryption according to an asymmetric cryptographic property), and transmits the first signature data to the first node. The second node, after hash signature on the local IDs, uses H2 to calculate hash values to obtain second intersection data H2(SK[H1(X)]), and transmits the second intersection data to the first node.

5) The first node, after receiving the first signature data R*SK[H1(Y)] signed by the second node by using the private key, eliminates the initial random number R to obtain original signature data SK[H1(Y)], uses the second mapping rule (H2) to calculate hash values of the original signature data to obtain first intersection data: H2(SK[H1(Y)]), and calculates an intersection with the second intersection data H2(SK[H1(X)]) transmitted by the second node to obtain an intersection result set (i.e., the exact intersection I).

The first node extracts part of the second intersection data H2(SK[H1(X)]) according to the obfuscation parameter and adds the part of the second intersection data to the intersection result set to obtain an obfuscation set. In some embodiments, the obfuscation set/intersection result set=obfuscation parameter. For example, if the obfuscation parameter is 5 and the intersection result set includes 10 IDs, the obfuscation set includes 50 IDs, in which 40 pieces of obfuscated data are randomly selected from the second intersection set. The obfuscation set is transmitted to the second node in a certain order to ensure that a positive sample ID is at a same position in the obfuscation set of the first node and the obfuscation set of the second node, so as to facilitate federated training.

As can be seen, in the obfuscation set acquired by the second node, all IDs are from a local set of the second node, and only part of the IDs belong to the intersection result set. Therefore, the second node cannot determine which IDs are from the first node. In some scenarios, the obfuscation set obtained by the second node may be exactly the same as the local set of the second node. In this way, the second node cannot obtain any additional information from the obfuscation set. All IDs in the obfuscation set not belonging to the intersection result set are encrypted. After obtaining the obfuscation set, the second node can only determine that hidden IDs (used for obfuscating IDs) do not belong to the intersection result set, but cannot obtain specific values of the IDs, thereby protecting private data of the first node.

Through the PSI protocols proposed in some embodiments, only one of participating parties can obtain the exact intersection (i.e., the intersection result set) and the other party can only obtain a superset of the intersection result set through collaborative computing. In some embodiments, an advertising provider obtains positive sample IDs (i.e., user IDs converted from the advertising platform) and encrypted negative samples (user IDs in the advertising platform that click on the advertisement and are not converted), the advertising provider only has label information locally (i.e., knows which users are converted from the advertising platform), the advertising platform has user features (i.e., features of the users who click on the advertisement, and "unlabeled" means not knowing which users are successfully converted), and the two parties can perform federated training and inference of a transformation prediction model without leaking the user IDs.

A data processing process according to some embodiments is described below with reference to FIG. 6 and FIG. 7.

Figure 6:
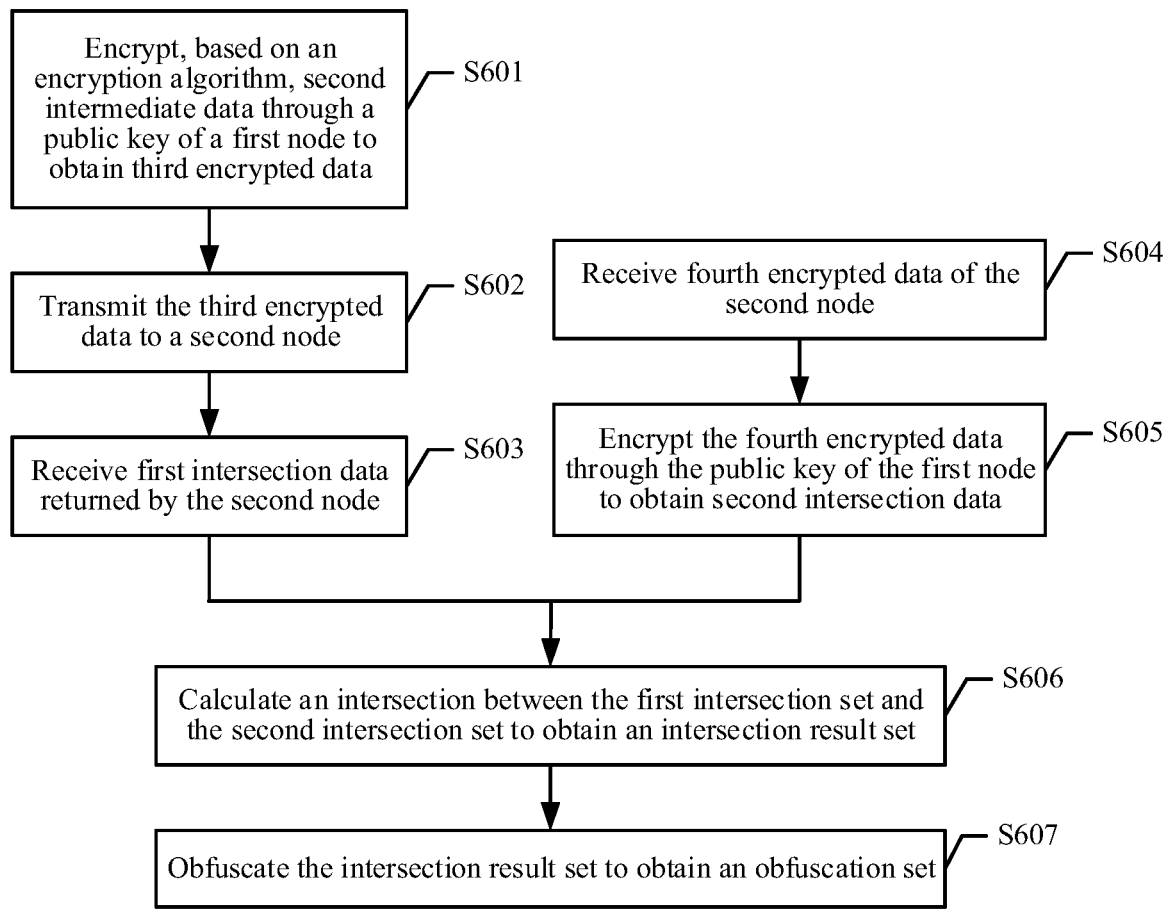
FIG. 6 is a schematic flowchart of a data processing method according to some embodiments.

FIG. 6 is a schematic flowchart of a data processing method according to some embodiments. The data processing method may be performed by a first node. The first node may be a computer device. The computer device may be, for example, an intelligent terminal, a server, or the like. For example, the first node may be the terminal device 101 shown in FIG. 1A. The method according to some embodiments may include the following operations.

S601: Encrypt, based on an encryption algorithm, second intermediate data through a public key of a first node to obtain third encrypted data, the second intermediate data being obtained after first to-be-processed data is mapped according to a third mapping rule.

The third mapping rule is an irreversible mapping rule (that is, original data cannot be inverted from results and the third mapping rule). The third mapping rule may specifically include, but is not limited to, a hash algorithm (e.g., SHA256).

In some embodiments, the third mapping rule is a hash operation rule, and the second intermediate data may be obtained after hash operation on user IDs recorded in the first node. The second intermediate data may be denoted as (H(Y)) or H(ID). The third encrypted data obtained by encryption using a public key of the first node may be denoted as (PK0[H(Y)]).

S602: Transmit the third encrypted data to a second node.

In some embodiments, the first node transmits the third encrypted data to the second node, so that the second node further encrypts the third encrypted data based on a public key of the second node to obtain first intersection data.

S603: Receive first intersection data returned by the second node to obtain a first intersection set including the first intersection data. The first intersection data is obtained after the third encrypted data is encrypted through a public key of the second node based on an encryption algorithm.

The first intersection data herein may be denoted as PK1[PK0[H(Y)]]. One piece of first intersection data may be obtained for each piece of first to-be-processed data, and the first intersection set is obtained based on all the first intersection data.

S604: Receive fourth encrypted data of the second node, the fourth encrypted data being obtained after third intermediate data is encrypted through the public key of the second node based on an encryption algorithm, the third intermediate data being obtained after second to-be-processed data of the second node is mapped through a third mapping rule.

The fourth encrypted data may be denoted as PK1[H(X)] or PK1[H(ID)]. The encryption algorithm correspondingly used for the fourth encrypted data and the encryption algorithm correspondingly used for the first intersection data may be same encryption algorithms and commutative encryption algorithms, for example, RSA algorithms (asymmetric encryption algorithms).

S605: Encrypt the fourth encrypted data through the public key of the first node to obtain second intersection data, so as to obtain a second intersection set including the second intersection data.

The second intersection data may be denoted as PK0[PK1[H(X)]].

S606: Calculate an intersection between the first intersection set and the second intersection set to obtain an intersection result set, the intersection result set including an intersection part between the first intersection data and the second intersection data.

In some embodiments, the calculating an intersection between the first intersection set and the second intersection set to obtain an intersection result set may be divided into two operations. In the first operation, the first intersection set is exchanged according to a characteristic of the commutative encryption algorithm to obtain a new first intersection set, and then an intersection between the new first intersection set and the second intersection set is calculated. The characteristic of the commutative encryption algorithm is: PK0[PK1[data]]=PK1[PK0[data]]. Therefore, each piece of first intersection data PK1[PK0[H(Y)]] in the first intersection set may be converted into new first intersection data PK0[PK1[H(Y)]], and a new first intersection set is obtained based on the new first intersection data. The new first intersection set may be compared with each piece of second intersection data PK0[PK1[H(X)]] in the second intersection set to obtain an intersection between the first intersection set and the second intersection set to obtain an intersection result set.

Each piece of data in the second intersection set may be exchanged to obtain a new second intersection set, and then an intersection between the new second intersection set and the first intersection set is calculated. After the second intersection data [PK1[H(X)]] in the second intersection set is exchanged to obtain new second intersection data PK1[PK0[H(X)]], each piece of new second intersection data in the second intersection set is compared with the first intersection data PK1[PK0[H(Y)]] in the first intersection set, so as to obtain an intersection part and obtain an intersection result set.

S607: Obfuscate the intersection result set to obtain an obfuscation set, the obfuscation set including obfuscated data and an intersection data set determined according to the intersection result set. The obfuscated data is determined according to data in the second intersection set, and the obfuscated data is non-correlated with data in the intersection data set.

In a case that the first intersection set is exchanged and the second intersection set is not exchanged, the obfuscated data being determined according to data in the second intersection set means that: the obfuscated data is data directly selected from the second intersection set, and the obfuscated data belongs to the second intersection set. The obfuscated data being non-correlated with data in the intersection data set means that: the obfuscated data does not belong to the intersection result set, that is, is non-correlated with the data in the intersection result set.

In a case that the first intersection set is not exchanged and the second intersection set is exchanged, the obfuscated data being determined according to data in the second intersection set means that: the obfuscated data is data selected from data obtained after each piece of the second intersection data in the second intersection set is exchanged. The obfuscated data being non-correlated with data in the intersection data set means that: the selected obfuscated data is different from each piece of first intersection data in the first intersection set.

Due to the characteristic of the commutative encryption algorithm, corresponding data before exchange and corresponding data after exchange (the second intersection data and the new second intersection data) are expressed in different forms but have actually the same values. Therefore, in any case, the obfuscated data can be considered as data directly selected from the second intersection set but not belonging to the intersection result set.

In some embodiments, during the obfuscation, P pieces of second intersection data may be selected from the second intersection set as the obfuscated data according to an obfuscation parameter, the obfuscated data does not belong to the intersection result set, and P is a positive integer. The obfuscated data is added to the intersection result set to obtain the obfuscation set. In some embodiments, some second intersection data may be directly selected from the second intersection set, and the selected second intersection data does not belong to the intersection result set, or new second intersection data corresponding to the selected second intersection data does not belong to the intersection result set.

After the obfuscation set is obtained, the obfuscation set may be returned to the second node as required, so that the second node performs corresponding processing. For example, federated training is performed based on the obfuscation set, or the obfuscation set is outputted and stored in a system such as a blockchain network.

In some embodiments, the first node encrypts the second intermediate data through the public key of the first node based on the encryption algorithm to obtain the third encrypted data, transmits the third encrypted data to the second node, and receives the first intersection data returned by the second node. In some embodiments, the first node receives the fourth encrypted data from the second node, and encrypts the fourth encrypted data through the public key of the first node to obtain the second intersection data. After obtaining the first intersection set and the second intersection set, the first node calculates the intersection between the first intersection set and the second intersection set to obtain the intersection result set, and obfuscates the intersection result set to obtain the obfuscation set. As can be seen, the calculation of the intersection between the first intersection data and the second intersection data obtained after encryption can better improve privacy and security of data exchange. An intersection of two data sets generated by data exchange or in other manners is calculated to meet a requirement of users of one party for intersection calculation. For example, an advertiser user can determine a conversion rate of an advertising platform by calculating an intersection, obfuscate obtained intersection data at the same time, and can also ensure that an obfuscation set finally outputted may not cause a problem of leakage of local data. For example, data that the advertiser feeds back to the advertising platform at the advertising platform's request may not directly expose data originally belonging to the advertiser.

Figure 7:
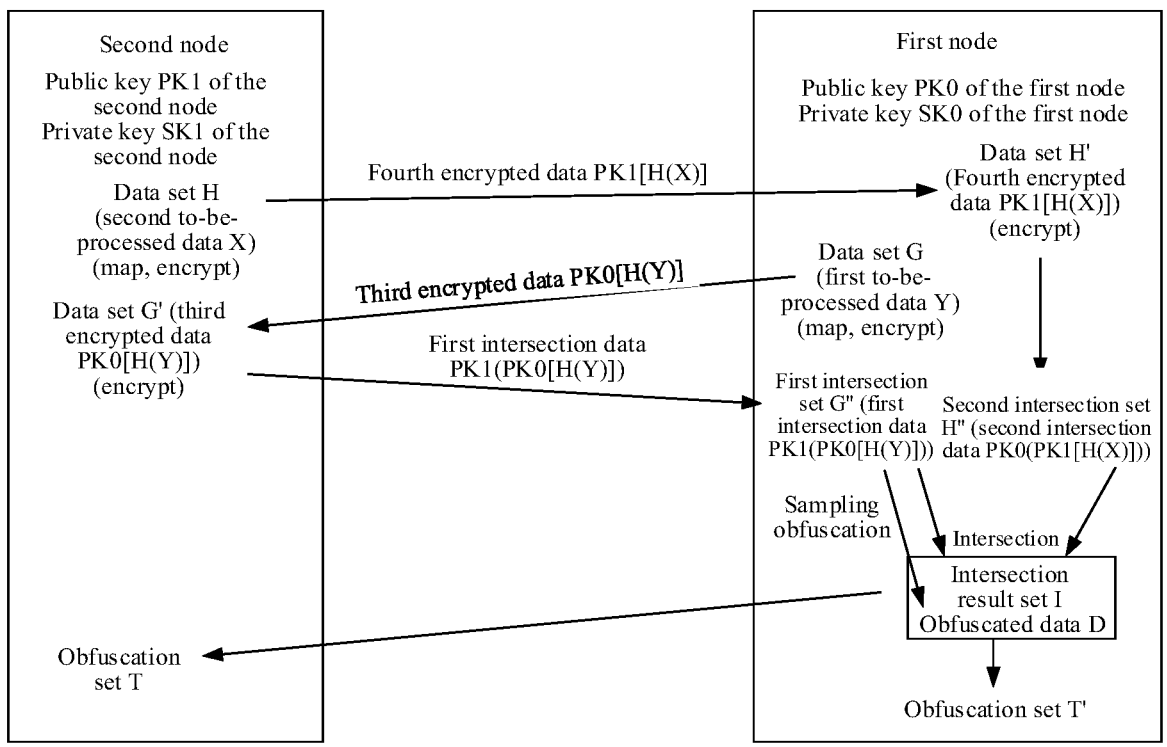
FIG. 7 is a schematic architectural diagram of data processing according to some embodiments.

FIG. 7 shows a schematic architectural diagram of data processing according to some embodiments. FIG. 7 shows a process of encryption, mapping, and intersection calculation between the first node and the second node. Specifically, keys of the first node are (SK0, PK0), first to-be-processed data Y is recorded in the first node, and a data set G includes a plurality of pieces of first to-be-processed data. Keys of the second node are (SK1, PK1), second to-be-processed data X is recorded in the second node, and a data set H includes a plurality of pieces of second to-be-processed data.

The first node performs hash calculation on the first to-be-processed data Y in G to obtain second intermediate data (H(Y)) corresponding to the first to-be-processed data Y.

The first node encrypts the second intermediate data (H(Y)) based on the public key of the first node to obtain third encrypted data (PK0[H(Y)]), and transmits the third encrypted data (PK0[H(Y)]) to the second node. A plurality of pieces of third encrypted data (PK0[H(Y)]) are recorded in a data set G'.

The second node encrypts the third encrypted data (PK0[H(Y)]) based on the public key of the second node to obtain first intersection data PK1[PK0[H(Y)]] corresponding to the third encrypted data, which forms a first intersection set, denoted as G".

The second node performs hash calculation on the second to-be-processed data recorded by the second node to obtain a plurality of pieces of third intermediate data (H(X)), and then encrypts the third intermediate data (H(X)) through the public key of the second node to obtain a plurality of pieces of fourth encrypted data PK1[H(X)]. The plurality of pieces of fourth encrypted data (PK1[H(X)]) are recorded in a data set H'.

The first node encrypts the fourth encrypted data through the public key of the first node to obtain second intersection data, which forms a second intersection set H".

The first node calculates an intersection between the first intersection set and the second intersection set, including a process of exchanging data in the first intersection set or the second intersection set.

The first node may obfuscate an intersection result set I by using obfuscated data D, and then transmit an obtained obfuscation set T to the second node to facilitate the second node to perform corresponding processing. In some possible embodiments, the intersection result set I obtained by calculating an intersection may also be directly transmitted to the second node. In some embodiments, the first node obtains a correlated obfuscation set T' corresponding to the obfuscation set T according to the obfuscated data D and the intersection result set I. In the obfuscation set T and the correlated obfuscation set T', in first to-be-processed data Y recorded by the first node and second to-be-processed data X recorded by the second node, a same sample ID (that is, the sample ID belongs to both the first to-be-processed data Y and the second to-be-processed data X) has a same position in the obfuscation set T and the correlated obfuscation set T' (specifically refer to a training sample (T) and a positive-negative sample (T') shown in FIG. 5), so as to facilitate subsequent further data processing (e.g., federated training).

In some embodiments, during data transmission, nodes of two parties perform encryption and the first node further performs obfuscation. During the data exchange, exchanged data is encrypted data, the two parties cannot directly acquire plaintext data, and during the data transmission, the data may not be leaked due to illegal interception of the data, which can better ensure privacy and security of the data. At the same time, for the first node, the obfuscated data is finally outputted, which also ensures that the data of the first node may not be leaked and further ensures the privacy of the data on the first node.

A data processing process according to some embodiments is described below with reference to FIG. 8 and FIG. 9.

Figure 8:
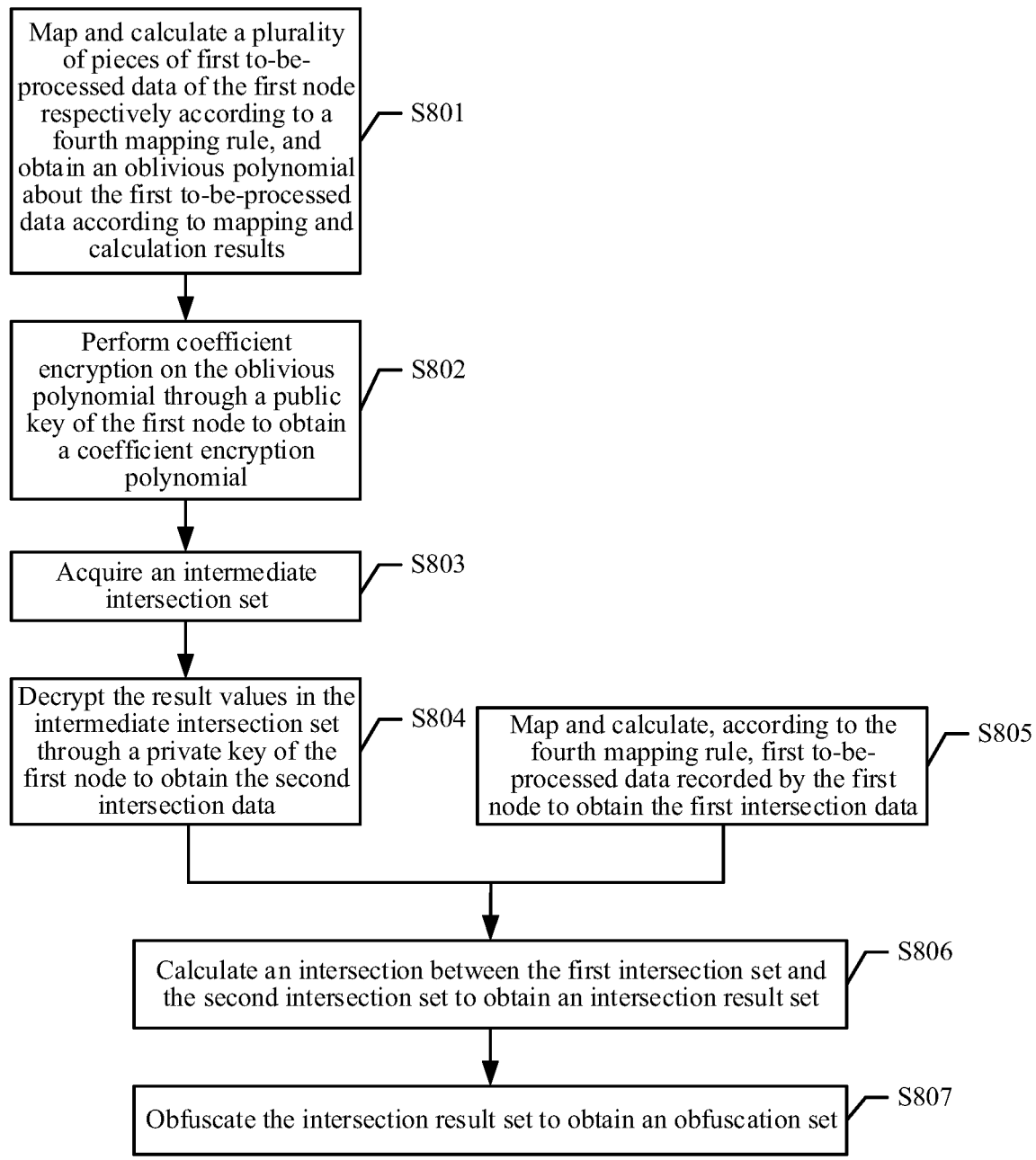
FIG. 8 is a schematic flowchart of a data processing method according to some embodiments.

FIG. 8 shows a schematic flowchart of a data processing method according some embodiments. The data processing method according may be performed by a first node. The first node may be a computer device. The computer device may be, for example, an intelligent terminal, a server, or the like. For example, the first node may be the terminal device 101 shown in FIG. 1A. The method according to some embodiments may include the following operations.

S801: Map and calculate a plurality of pieces of first to-be-processed data of the first node respectively according to a fourth mapping rule, and obtain an oblivious polynomial about the first to-be-processed data according to mapping and calculation results, the oblivious polynomial taking the mapping and calculation results as roots.

The fourth mapping rule is an irreversible mapping rule (that is, original data cannot be inverted from results and mapping rules), which may specifically include, but is not limited to, a hash algorithm (e.g., SHA256). In some embodiments, the obtained oblivious polynomial is expressed as follows:

$$P = (X - H(ID0))(X - H(IDn)) \qquad \text{Formula 1}$$
$$= Xn + c0Xn - 1 + c1Xn - 2 + \ldots + cn - 1 X0$$

where ID0, ID1, ..., and IDn respectively correspond to n pieces of different first to-be-processed data Y in the first node.

S802: Perform coefficient encryption on the oblivious polynomial through a public key of the first node to obtain a coefficient encryption polynomial.

In some embodiments, the obtained coefficient encryption polynomial is expressed as follows:

$$P'=Xn \oplus PK[c0] \odot Xn-1 \oplus \ldots \oplus PK[cn-1] \odot X0 \qquad \text{Formula 2;}$$

where $\oplus$ denotes homomorphic addition, and $\odot$ denotes homomorphic scalar multiplication.

For target second to-be-processed data in the second node, when a value obtained according to the fourth mapping rule is substituted into the coefficient encryption polynomial for calculation, if first to-be-processed data the same as the target second to-be-processed data exists, a calculation result of the coefficient encryption polynomial into which the target second to-be-processed data is substituted is 0. If the first to-be-processed data the same as the target second to-be-processed data does not exist, the calculation result is not 0.

The first node converts IDs and other types of data (the first to-be-processed data) recorded on each local end into roots of the polynomial, then performs encryption by using the public key, and passes the coefficient encryption polynomial or each root of the coefficient encryption polynomial to the second node. The second node performs corresponding processing to obtain an intermediate intersection set (V'). During the processing, the second node cannot recover all the first to-be-processed data therefrom. The second node can only substitute, as agreed, IDs and other types of data (the second to-be-processed data) recorded in the second node into the coefficient encryption polynomial for calculation as required, and then perform homomorphic scalar multiplication and homomorphic addition to output result values respectively corresponding to the second to-be-processed data.

S803: Acquire an intermediate intersection set, the intermediate intersection set including a plurality of result values, one result value in the intermediate intersection set corresponding to one piece of second to-be-processed data of a second node, the result value being obtained in the following manner: substituting the fourth intermediate data into the coefficient encryption polynomial to calculate an intermediate value, and homomorphically calculating the intermediate value through a homomorphic operation rule to obtain the result value, the fourth intermediate data being data obtained after the second to-be-processed data of the second node is mapped and calculated according to the fourth mapping rule.

In some embodiments, the homomorphically calculating the intermediate value through a homomorphic operation rule includes: performing homomorphic scalar multiplication on the intermediate value and a random number, and then performing homomorphic addition with the second to-be-processed data correlated with the fourth intermediate data corresponding to the intermediate value. An expression used in the homomorphism calculation is as follows:

$$R \odot P'(H(ID)) \oplus ID \qquad \text{Formula 3;}$$

where H(ID) specifically denotes the fourth intermediate data obtained after hash mapping on the corresponding second to-be-processed data according to the fourth mapping rule. The ID in the expression corresponds to one piece of second to-be-processed data (X) of the second node. The ID corresponds to the second to-be-processed data correlated with the fourth intermediate data described above.

In other words, the second node may obtain a result value after substituting each piece of data obtained after hash mapping on the corresponding second to-be-processed data through the fourth mapping rule into the coefficient encryption polynomial, and a mapping relationship between the second to-be-processed data X and the corresponding result values may be automatically established in the second node, so that the obfuscation set returned by the first node can be later restored according to the mapping relationship, and the second to-be-processed data X corresponding to each piece of data in the obfuscation set can be determined.

S804: Decrypt the result values in the intermediate intersection set through a private key of the first node to obtain the second intersection data.

The root of the polynomial is obtained by encryption by using the public key in S802. Herein, the intermediate intersection set fed back from the second node is decrypted by using the private key of the first node, to obtain second intersection data. A second intersection set including the second intersection data is finally obtained.

The process of acquiring the first intersection data and obtaining the first intersection set from S801 to S804 is illustrated as follows:

The first to-be-processed data a and b recorded in the first node are expanded according to (X−H(a))(X−H(b)) to obtain an oblivious polynomial: X2−(H(a)+H(b))X+H(a)H(b). Coefficients are respectively: c1=1, c2=−(H(a)+H(b)), and c3=H(a)H(b). The original oblivious polynomial may be written as c1*X2+c2*X+c3. H(a) and H(b) are values after the first to-be-processed data a and b are mapped and calculated according to the fourth mapping rule. The description herein is based on an example in which the first to-be-processed data includes a and b. Normally, a plurality of pieces of first to-be-processed data are provided. Therefore, the expression of the oblivious polynomial including a plurality of pieces of or a large amount of first to-be-processed data may be obtained with reference to the foregoing description, i.e., Formula 1 described above.

c1, c2, and c3 are respectively encrypted by using the public key PK of the first node to obtain PK[c1], PK[c2], and PK[c3], an encryption polynomial is obtained, i.e., PK[c1]*X2+PK[c2]*X+PK[c3], and the encryption polynomial is transmitted to the second node. The first node may also pass only PK[c1], PK[c2], and PK[c3]. The second node may generate an encryption polynomial based on PK[C1], PK[C2], PK[C3] for related substitution calculation and other processing.

The second node receives PK[c1], PK[c2], and PK[c3], determines one piece of data from the plurality of pieces of second to-be-processed data, such as ID1, and performs mapping calculation (hash calculation) on the ID1 through the fourth mapping rule to obtain H(ID1), which is denoted as d. d is substituted into the coefficient encryption polynomial to obtain: PK[c1]⊙d2 ⊕PK[c2]⊙d⊕PK[c3]. For the coefficient encryption polynomial, if ID1=a or ID1=b, i.e., d=H(a) or d=H(b), the corresponding coefficient encryption polynomial may be PK[c1]⊙d2⊕PK[c2]⊙d⊕PK[c3]=PK[0]. Based on the coefficient encryption polynomial, V'=R⊙(PK[c1]⊙d2⊕PK[c2]⊕d⊕PK[c3])⊕ID corresponding to each piece of second to-be-processed data in the second node may be calculated. Specifically, $$V'=R\odot(PK[c1]\oplus d2\oplus PK[c2]\oplus d\oplus PK[c3])\oplus ID$$
$$ID=PK[R*c1*d2+R*c2*d+R*c3+ID]$$

If ID1=a or ID1=b, V'=PK[hash (ID1)]. One V' may be obtained based on different second to-be-processed data, for example, second to-be-processed data ID2, ID3, ID4, . . . , IDm, and the like. A plurality of V' constitute an intermediate intersection set.

For the result values in the intermediate intersection set, the first node may perform decryption through the private key. For example, V'=PK[hash(ID1)] is decrypted through the private key, and then hash (ID1) can be obtained. For the result value V' that cannot be correctly decrypted, for example, when ID2≠a and ID2≠b, after ID2 is substituted into the coefficient encryption polynomial, a value that cannot be recognized or effectively decrypted but corresponds to ID2 may be obtained, i.e., PK[corresponding value]. Even if the first node performs decryption through the private key, an unrecognized or invalid value denoted as "a corresponding value" may be obtained. The unrecognized or invalid value means that the value is different from any piece of first to-be-processed data. However, the second node can determine original second to-be-processed data ID2 based on the PK[corresponding value] of the "corresponding value" through the mapping relationship described in S803.

S805: Map and calculate, according to the fourth mapping rule, first to-be-processed data recorded by the first node to obtain the first intersection data.

The first intersection set can be obtained based on a plurality of pieces of first intersection data.

S806: Calculate an intersection between the first intersection set and the second intersection set to obtain an intersection result set, the intersection result set including an intersection part between the first intersection data and the second intersection data.

As described above, after the result values are decrypted through the private key of the first node, data such as hash (ID1) after hash mapping on the second to-be-processed data may be obtained, and some unrecognized or invalid value are obtained. The second intersection set also includes some second intersection data after hash mapping on the first to-be-processed data. When the first to-be-processed data is the same as one piece of second to-be-processed data, the corresponding first intersection data and second intersection data are the same, and the intersection result set can be obtained accordingly.

S807: Obfuscate the intersection result set to obtain an obfuscation set, the obfuscation set including obfuscated data and an intersection data set determined according to the intersection result set. The obfuscated data is determined according to data in the second intersection set, and the obfuscated data is non-correlated with data in the intersection data set.

In some embodiments, the obfuscated data being determined according to data in the second intersection set means: selecting result values from the intermediate intersection set corresponding to the second intersection set as the obfuscated data. The intersection data set determined according to the intersection result set means that: the intersection data set includes result values corresponding to the data in the intersection result set. The obfuscated data being non-correlated with data in the intersection data set means that: the result values selected from the intermediate intersection set as the obfuscated data are different from the result values corresponding to the data in the intersection result set.

In some embodiments, during the obfuscation, P pieces of data (i.e., P result values) are selected from the intermediate intersection set corresponding to the second intersection set according to an obfuscation parameter, P is a positive integer, and result values corresponding to the P pieces of data are taken as the obfuscated data. The P result values are different from the result values corresponding to the data in the intersection result set.

The first node may transmit the obfuscation set to the second node. The second node can determine each piece of second to-be-processed data according to the mapping relationship through the result values in the obfuscation set, and can perform data processing such as federated training based on the determined second to-be-processed data.

In some embodiments, on the one hand, the first node respectively maps and calculates the plurality of pieces of first to-be-processed data of the first node according to the fourth mapping rule, obtains the oblivious polynomial about the first to-be-processed data according to mapping and calculation results, performs coefficient encryption on the oblivious polynomial through the public key of the first node to obtain the coefficient encryption polynomial, acquires the intermediate intersection set, and decrypts the result values in the intermediate intersection set through the private key of the first node to obtain the second intersection data. On the other hand, the first node maps and calculates, according to the fourth mapping rule, the first to-be-processed data recorded by the first node to obtain the first intersection data. After obtaining the first intersection set and the second intersection set, the first node calculates the intersection between the first intersection set and the second intersection set to obtain the intersection result set, and obfuscates the intersection result set to obtain the obfuscation set. As can be seen, the calculation of the intersection between the first intersection data and the second intersection data obtained after encryption can better improve privacy and security of data exchange. An intersection of two data sets generated by data exchange or in other manners is calculated to meet a requirement of users of one party for intersection calculation. For example, an advertiser user can determine a conversion rate of an advertising platform by calculating an intersection, obfuscate obtained intersection data at the same time, and can also ensure that an obfuscation set finally outputted may not cause a problem of leakage of local data. For example, data that the advertiser feeds back to the advertising platform at the advertising platform's request may not directly expose data originally belonging to the advertiser.

Figure 9:
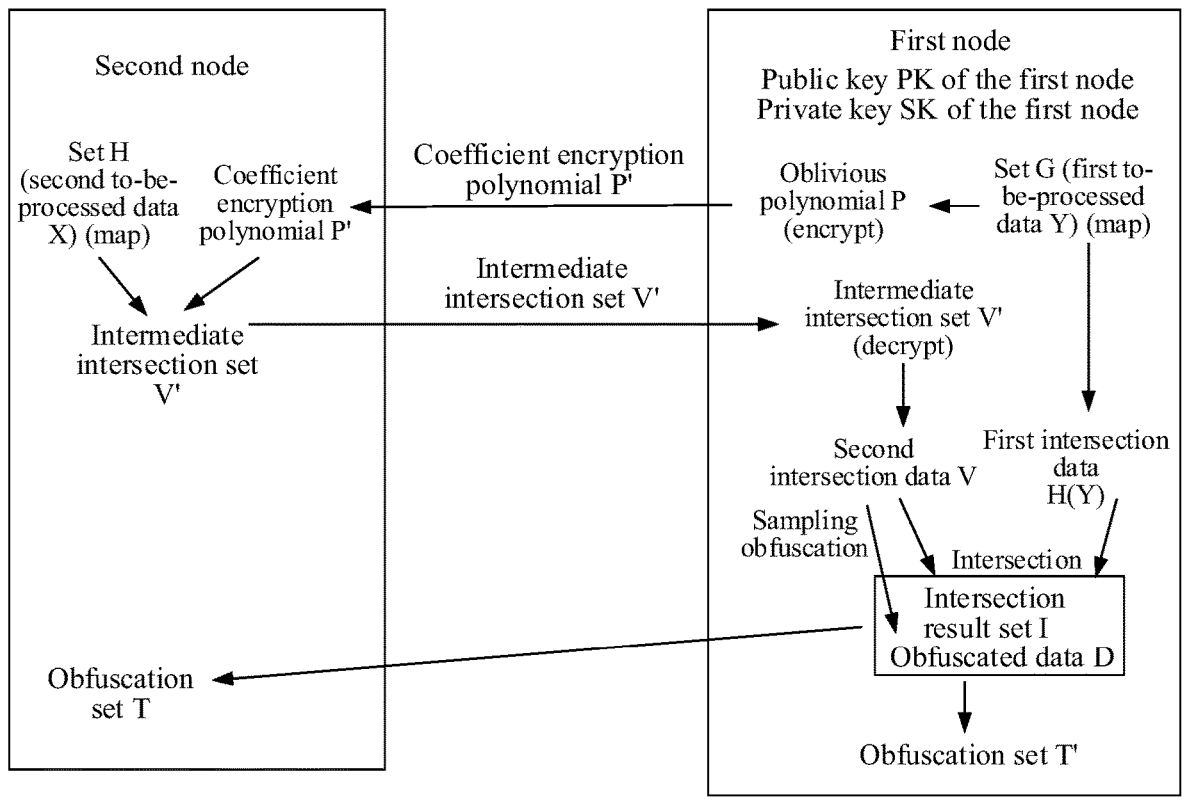
FIG. 9 is a schematic architectural diagram of data processing according to some embodiments.

FIG. 9 shows a schematic architectural diagram of data processing according to some embodiments. FIG. 9 also shows a process of encryption, mapping, and intersection calculation between the first node and the second node. Specifically, keys of the first node are (SK, PK), first to-be-processed data Y is recorded in the first node, and a data set G includes a plurality of pieces of first to-be-processed data. In some embodiments, keys of the second node are not needed, second to-be-processed data X is recorded in the second node, and a data set H includes a plurality of pieces of second to-be-processed data.

The first node generates an oblivious polynomial P based on the first to-be-processed data in the data set G. The oblivious polynomial P may be the "Formula 1" above.

Coefficients in the oblivious polynomial P are encrypted through the public key PK of the first node to obtain a coefficient encryption polynomial. The coefficient encryption polynomial may be the "Formula 2" above, and the coefficient encryption polynomial is transmitted to the second node, or roots after coefficient encryption are sent to the second node, and the second node constructs a coefficient encryption polynomial based on the roots.

The second node receives the coefficient encryption polynomial P'. The second node respectively maps the second to-be-processed data included in the data set H through the fourth mapping rule to obtain respective fourth intermediate data, and then substitutes the fourth intermediate data into the coefficient encryption polynomial P' to obtain a result value corresponding to each piece of fourth intermediate data. The result values constitute an intermediate intersection set V'.

The second node transmits the obtained intermediate intersection set V' to the first node.

The first node, after receiving the intermediate intersection set V', decrypts each result value therein through the private key of the first node to obtain a second intersection set V after encryption.

The first node may further map the first to-be-processed data in G based on the fourth mapping rule to obtain the first intersection set.

The first node calculates an intersection between the first intersection set and the second intersection set to obtain the intersection result set I.

The first node may obfuscate the intersection result set I by using the obfuscated data D, and then transmit an obtained obfuscation set T to the second node to facilitate the second node to perform corresponding processing. In some possible embodiments, the intersection result set I obtained by calculating an intersection may also be directly transmitted to the second node. In some embodiments, the first node obtains a correlated obfuscation set T' corresponding to the obfuscation set T according to the obfuscated data D and the intersection result set I. In the obfuscation set T and the correlated obfuscation set T', in first to-be-processed data Y recorded by the first node and second to-be-processed data X recorded by the second node, a same sample ID (that is, the sample ID belongs to both the first to-be-processed data Y and the second to-be-processed data X) has a same position in the obfuscation set T and the correlated obfuscation set T' (specifically refer to a training sample (T) and a positive-negative sample (T') shown in FIG. 5), so as to facilitate subsequent further data processing (e.g., federated training).

In some embodiments, the first node and the second node first transmit a polynomial or roots of a polynomial, and the data is encrypted through the public key, which can ensure security and privacy of the data on the first node, greatly reducing the risk of data leakage. Data subsequently transmitted from the second node to the first node is also calculation results of the polynomial, including valid data of the second node and some invalid data, which increases the difficulty of data cracking by force. Through some embodiments, privacy and security of data can be better ensured during the data exchange. At the same time, for the first node, the obfuscated data is finally outputted, which also ensures that the data of the first node may not be leaked and further ensures the privacy of the data on the first node.

The method in some embodiments is described in detail above. For ease of better implementing the foregoing solutions in the embodiments, an apparatus in some embodiments is correspondingly provided in the following.

Figure 10:
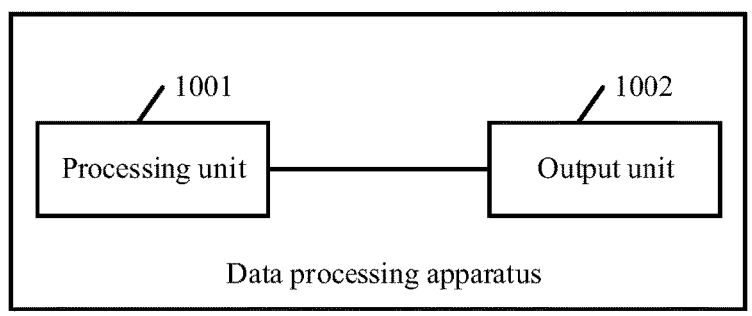
FIG. 10 is a schematic structural diagram of a data processing apparatus according to some embodiments.

FIG. 10 is a schematic structural diagram of a data processing apparatus according to some embodiments. The apparatus may be mounted on a computer device in the above method embodiment. For example, the apparatus may be mounted on the terminal device 101 in FIG. 1A. The data processing apparatus shown in FIG. 10 may be configured to perform some or all functions in the method embodiments described in FIG. 1b, FIG. 3, FIG. 4, FIG. 6, and FIG. 8. Units are described in detail as follows.

A processing unit 1001 is configured to acquire a first intersection set, the first intersection set including N pieces of first intersection data, N being a positive integer; acquire a second intersection set, the second intersection set including M pieces of second intersection data, M being a positive integer; calculate an intersection between the first intersection set and the second intersection set to obtain an intersection result set, the intersection result set including an intersection part between the first intersection data and the second intersection data; and obfuscate the intersection result set to obtain an obfuscation set, the obfuscation set including obfuscated data and an intersection data set determined according to the intersection result set, the obfuscated data being determined according to data in the second intersection set, and the obfuscated data being non-correlated with data in the intersection data set.

An output unit 1002 is configured to output the obfuscation set.

In some embodiments, the processing unit 1001 is specifically configured to:
  select P pieces of second intersection data from the second intersection set as the obfuscated data according to an obfuscation parameter, the obfuscated data not belonging to the intersection result set, P being a positive integer; and
  add the obfuscated data to the intersection result set to obtain the obfuscation set.

In some embodiments, the processing unit 1001 may be configured to:

acquire first signature data, the first signature data being data obtained after first encrypted data is signed using a private key of a second node, the first encrypted data being data obtained after a first node encrypts first to-be-processed data; and calculate the first intersection data corresponding to the first signature data according to the first signature data; and configured to:

acquire the second intersection data, the second intersection data being data obtained after second signature data is mapped, the second signature data being data obtained after mapped data is signed using the private key of the second node, the mapped data being data obtained after second to-be-processed data is mapped.

In some embodiments, the processing unit 1001 may be configured to:

map the first to-be-processed data by using a first mapping rule, to obtain first intermediate data;

acquire a public key of the second node, and encrypt an original random number by using the public key of the second node, to obtain an encrypted random number corresponding to the first intermediate data; and generate the first encrypted data according to the first intermediate data and the encrypted random number corresponding to the first intermediate data.

In some embodiments, the processing unit 1001 may be:

calculate original signature data according to the original random number and the first signature data, the original signature data matching data obtained after the first intermediate data is signed using the private key of the second node; and map the original signature data by using a second mapping rule, to obtain the first intersection data corresponding to the first signature data.

In some embodiments, the processing unit 1001 may be configured to:

encrypt, based on an encryption algorithm, second intermediate data through a public key of a first node to obtain third encrypted data, the second intermediate data being obtained after first to-be-processed data is mapped according to a third mapping rule;

transmit the third encrypted data to a second node; and receive the first intersection data returned by the second node to obtain a first intersection set including the first intersection data; the first intersection data being obtained after the third encrypted data is encrypted through a public key of the second node based on the encryption algorithm; and configured to:

receive fourth encrypted data of the second node, the fourth encrypted data being obtained after third intermediate data is encrypted through the public key of the second node based on an encryption algorithm, the third intermediate data being obtained after second to-be-processed data of the second node is mapped through a third mapping rule; and encrypt the fourth encrypted data through the public key of the first node to obtain the second intersection data, so as to obtain the second intersection set including the second intersection data.

The encryption algorithm is a commutative encryption algorithm.

In some embodiments, the processing unit 1001 may be configured to:

map and calculate, according to a fourth mapping rule, first to-be-processed data recorded by a first node to obtain the first intersection data;

and configured to:

map and calculate a plurality of pieces of first to-be-processed data of the first node respectively according to the fourth mapping rule, and obtain an oblivious polynomial about the first to-be-processed data according to mapping and calculation results, the oblivious polynomial taking the mapping and calculation results as roots;

perform coefficient encryption on the oblivious polynomial through a public key of the first node to obtain a coefficient encryption polynomial;

acquire an intermediate intersection set, the intermediate intersection set including: a plurality of result values, one result value in the intermediate intersection set corresponding to one piece of second to-be-processed data of a second node, the result value being obtained in the following manner: substituting the fourth intermediate data into the coefficient encryption polynomial to calculate an intermediate value, and homomorphically calculating the intermediate value through a homomorphic operation rule to obtain the result value, the fourth intermediate data being data obtained after the second to-be-processed data of the second node is mapped and calculated according to the fourth mapping rule; and decrypt the result values in the intermediate intersection set through a private key of the first node to obtain the second intersection data.

In some embodiments, the homomorphically calculating the intermediate value through a homomorphic operation rule to obtain the result value includes:

performing homomorphic scalar multiplication on the intermediate value and a random number, and then performing homomorphic addition with the fourth intermediate data corresponding to the intermediate value, to obtain the result value.

According to some embodiments, some operations involved in the data processing methods shown in FIG. 1b, FIG. 3, FIG. 4, FIG. 6, and FIG. 8 may be performed by the units in the data processing apparatus shown in FIG. 10. For example, operation S101 to operation S104 shown in FIG. 1b may be performed by the processing unit 1001 shown in FIG. 10. For example, operation S301 to operation S304 shown in FIG. 3 may be performed by the processing unit 1001 shown in FIG. 10. For example, operation S401 to operation S404 shown in FIG. 4 may be performed by the processing unit 1001 shown in FIG. 10. For example, operation S601 to operation S607 shown in FIG. 6 may be performed by the processing unit 1001 shown in FIG. 10. Units of the system for data processing apparatus shown in FIG. 10 may be separately or wholly combined into one or several other units, hardware or software, or one (or more) of the units herein may further be divided into multiple units of smaller functions. In this way, same operations can be implemented, and implementation of the technical effects of the embodiments is not affected. The foregoing units are divided based on logical functions. In some embodiments, a function of one unit may also be implemented by a plurality of units, or functions of a plurality of units are implemented by one unit. In some embodiments, the data processing apparatus may also include other units. In some embodiments, the functions may also be cooperatively implemented by other units and may be cooperatively implemented by a plurality of units.

According to some embodiments, a computer program (including program code) that can perform the operation in the corresponding method shown in FIG. 1b, FIG. 3, FIG. 4, FIG. 6, and FIG. 8 may be run on a general computing apparatus, such as a computer, which includes processing elements and storage elements such as a central processing unit (CPU), a random access memory (RAM), and a read-only memory (ROM), to construct the data processing apparatus shown in FIG. 10 and implement the data processing method in some embodiments. The computer program may be recorded in, for example, a computer readable recording medium, and may be loaded into the foregoing computing device by using the computer readable recording medium, and run in the computing apparatus.

Based on a same inventive concept, a problem resolving principle and beneficial effects of the data processing apparatus according to some embodiments are similar to the problem resolving principle and beneficial effects of the data processing method in some embodiments, which may be obtained with reference to the principle and the beneficial effects of the implementation of the method. For brevity, details are not described herein again.

Figure 11:
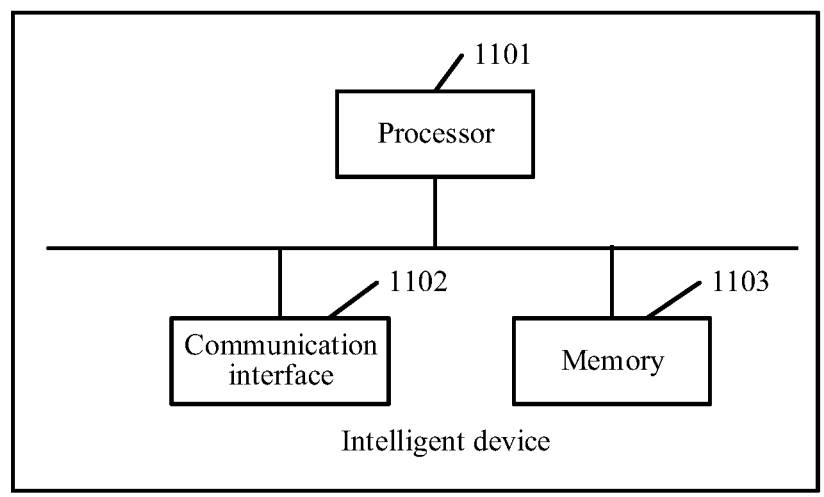
FIG. 11 is a schematic structural diagram of an intelligent device according to some embodiments.

FIG. 11 is a schematic structural diagram of an intelligent device according to some embodiments. The intelligent device includes at least a processor 1101, a communication interface 1102, and a memory 1103. The processor 1101, the communication interface 1102, and the memory 1103 may be connected via a bus or in another manner. Connection via a bus is used as in some embodiments. The processor 1101 (or referred to as a central processing (CPU)) is a computing core and control core of the computer device. The processor can parse various instructions in the terminal device and process various data of the terminal device. The CPU may be configured to parse a turn-on or turn-off instruction transmitted by a user to the terminal device and control the terminal device to perform a turn-on or turn-off operation. In some embodiments, the CPU may transmit various types of interactive data between internal structures of the terminal device, and the like. In some embodiments, the communication interface 1102 may include a standard wired interface and a standard wireless interface (such as WiFi and a mobile communication interface), and is controlled by the processor 1101 to be configured to send and receive data. The communication interface 1102 can also be used for data transmission and interaction within the terminal device. The memory 1103 is a memory device of the terminal device, and is configured to store a program and data. It should be understood that the memory 1103 here may include an internal memory of the terminal device, and may also include an expanded memory supported by the terminal device. The memory 1103 provides a storage space, storing an operating system of the terminal device, which may include, but is not limited to: an Android system, an iOS system, a Windows Phone system, and the like, which is not limited herein.

In some embodiments, the intelligent device may be a terminal device, for example, the terminal device 101 shown in FIG. 1a. In this case, the processor 1101 performs the data processing methods according to some embodiments by running executable program code in the memory 1103.

Some embodiments further provide a computer storage medium, storing one or more instructions, the one or more instructions being loaded and executed by a processor to perform the data processing method provided in the foregoing method embodiments.

Some embodiments further provide a computer program product including instructions. When the computer program product runs on a computer, the computer is caused to perform the data processing method provided in the foregoing method embodiments.

According to some embodiments, a computer program product or a computer program is further provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the foregoing data processing method.

A sequence of the operations of the method in some embodiments may be adjusted, and certain operations may also be combined or removed according to an actual requirement.

The modules in the apparatus in some embodiments may be combined, divided, and deleted according to an actual requirement.

a person of ordinary skill in the art may understand that all or some of the operations of the various methods in the foregoing embodiments may be implemented by a program instructing relevant hardware. The program may be stored in a computer-readable storage medium. The readable storage medium may include: a flash drive, a Read-Only Memory (ROM), a Random Access Memory (RAM), a magnetic disk, an optical disc, and the like.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A data processing method, performed by a first node comprising a computer device, the data processing method comprising:

acquiring a first intersection set comprising N pieces of first intersection data, the first intersection data comprising a first plurality of user identifiers from raw data from a storage of the computer device, and N being a positive integer;

acquiring a second intersection set comprising M pieces of second intersection data, the second intersection data comprising a second plurality of user identifiers received from a second node, and M being a positive integer;

calculating an intersection between the first intersection set and the second intersection set to obtain an intersection result set that includes an intersecting portion of the first intersection data and the second intersection data;

obfuscating the intersection result set to obtain an obfuscation set that comprises:
obfuscated data based on data in the second intersection set, and
an intersection data set based on the intersection result set,
wherein the obfuscated data is not correlated with data in the intersection data set;

generating a first training data set based on the obfuscation set, wherein the first training data set comprises a plurality of obfuscated user identifiers of the obfuscation set aligned with first user data;

calculating a first gradient of the first training data set;
transmitting the obfuscation set to the second node, such that the raw data is not exposed to the second node, to cause the second node to calculate and transmit a second gradient to a third node;
transmitting the first gradient to the third node; and
receiving from the third node a total gradient based on the first gradient and the second gradient.

2. The data processing method according to claim 1, wherein the obfuscating comprises:
selecting, from the second intersection set according to an obfuscation parameter, P pieces of second intersection data that does not belong to the intersection result set as the obfuscated data, P being a positive integer; and
adding the obfuscated data to the intersection result set to obtain the obfuscation set.

3. The data processing method according to claim 1, wherein the acquiring the first intersection set comprises:
acquiring first signature data, the first signature data being data obtained based on first encrypted data being signed using a private key of the second node, the first encrypted data being data obtained based on encrypting first to-be-processed data; and
calculating the first intersection data corresponding to the first signature data according to the first signature data; and
the acquiring the second intersection set comprises:
acquiring the second intersection data, the second intersection data being data obtained based on second signature data being mapped, the second signature data being data obtained based on mapped data being signed using the private key of the second node, the mapped data being data obtained based on second to-be-processed data being mapped.

4. The data processing method according to claim 3, wherein the first encrypted data is obtained by operations including:
mapping the first to-be-processed data by using a first mapping rule to obtain first intermediate data;
acquiring a public key of the second node, and encrypting an original random number by using the public key of the second node to obtain an encrypted random number corresponding to the first intermediate data; and
generating the first encrypted data according to the first intermediate data and the encrypted random number corresponding to the first intermediate data.

5. The data processing method according to claim 4, wherein the calculating the first intersection data comprises:
calculating original signature data according to the original random number and the first signature data, the original signature data matching data obtained based on the first intermediate data being signed using the private key of the second node; and
mapping the original signature data by using a second mapping rule, to obtain the first intersection data corresponding to the first signature data.

6. The data processing method according to claim 1, wherein the acquiring the first intersection set comprises:
encrypting, based on an encryption algorithm, second intermediate data through a public key of the first node to obtain third encrypted data, the second intermediate data being obtained based on first to-be-processed data being mapped according to a third mapping rule;
transmitting the third encrypted data to the second node; and
receiving the first intersection data returned by the second node to obtain the first intersection set comprising the first intersection data; the first intersection data being obtained based on the third encrypted data being encrypted through a public key of the second node based on the encryption algorithm;
wherein the acquiring the second intersection set comprises:
receiving fourth encrypted data of the second node, the fourth encrypted data being obtained based on third intermediate data being encrypted through the public key of the second node based on the encryption algorithm, the third intermediate data being obtained based on second to-be-processed data of the second node being mapped through the third mapping rule; and
encrypting the fourth encrypted data through the public key of the first node to obtain the second intersection data, so as to obtain the second intersection set comprising the second intersection data; and
wherein the encryption algorithm is a commutative encryption algorithm.

7. The data processing method according to claim 1, wherein the acquiring the first intersection set comprises:
mapping and calculating, according to a fourth mapping rule, first to-be-processed data recorded by the first node to obtain the first intersection data; and
the acquiring the second intersection set comprises:
mapping and calculating a plurality of pieces of first to-be-processed data of the first node respectively according to the fourth mapping rule, and obtaining an oblivious polynomial about the first to-be-processed data according to mapping and calculation results, the oblivious polynomial taking the mapping and calculation results as roots;
performing coefficient encryption on the oblivious polynomial through a public key of the first node to obtain a coefficient encryption polynomial;
acquiring an intermediate intersection set, the intermediate intersection set comprising a plurality of result values, one result value in the intermediate intersection set corresponding to one piece of second to-be-processed data of the second node, the result value being obtained in the following manner: substituting fourth intermediate data into the coefficient encryption polynomial to calculate an intermediate result value, and homomorphically calculating the intermediate result value through a homomorphic operation rule to obtain the result value, the fourth intermediate data being data obtained based on the second to-be-processed data of the second node being mapped and calculated according to the fourth mapping rule; and
decrypting the result values in the intermediate intersection set through a private key of the first node to obtain the second intersection data.

8. The data processing method according to claim 7, wherein the homomorphically calculating comprises:
performing homomorphic scalar multiplication on the intermediate result value and a random number, and performing homomorphic addition with the fourth intermediate data corresponding to the intermediate result value, to obtain the result value.

9. A first node comprising a data processing apparatus, the data processing apparatus comprising:
at least one memory configured to store program code;
a storage; and
at least one processor configured to read the program code and operate as instructed by the program code, the program code comprising:

processing code configured to cause at least one of the
at least one processor to:
acquire a first intersection set comprising N pieces of
first intersection data, the first intersection data
comprising a first plurality of user identifiers from
raw data from the storage, and N being a positive
integer;
acquire a second intersection set comprising M
pieces of second intersection data, the second
intersection data comprising a second plurality of
user identifiers received from a second node, and
M being a positive integer;
calculate an intersection between the first intersection set and the second intersection set to obtain an
intersection result set that includes an intersecting
portion of the first intersection data and the second
intersection data; and
obfuscate the intersection result set to obtain an
obfuscation set that comprises:
obfuscated data based on data in the second intersection set, and
an intersection data set based on the intersection
result set,
wherein the obfuscated data is not correlated with
data in the intersection data set;
generating code configured to cause at least one of the
at least one processor to generate a first training data
set based on the obfuscation set, wherein the first
training data set comprises a plurality of obfuscated
user identifiers of the obfuscation set aligned with
first user data;
calculating code configured to cause at least one of the
at least one processor to calculate a first gradient of
the first training data set;
first transmitting code configured to cause at least one
of the at least one processor to transmit the obfuscation set to the second node, such that the raw data
is not exposed to the second node, to cause the
second node to calculate and transmit a second
gradient to a third node;
second transmitting code configured to cause at least
one of the at least one processor to transmit the first
gradient to the third node; and
receiving code configured to cause at least one of the at
least one processor to receive from the third node a
total gradient based on the first gradient and the
second gradient.

10. The data processing apparatus according to claim 9, wherein the processing code is further configured to cause at least one of the at least one processor to:
select, from the second interaction set according to an obfuscation parameter, P pieces of second intersection data that does not belong to the intersection result set as the obfuscated data, P being a positive integer; and
add the obfuscated data to the intersection result set to obtain the obfuscation set.

11. The data processing apparatus according to claim 9, wherein the processing code is further configured to cause at least one of the at least one processor to:
acquire first signature data, the first signature data being data obtained based on first encrypted data being signed using a private key of the second node, the first encrypted data being data obtained based on encrypting first to-be-processed data; and
calculate the first intersection data corresponding to the first signature data according to the first signature data; and acquire the second intersection data, the second intersection data being data obtained based on second signature data being mapped, the second signature data being data obtained based on mapped data being signed using the private key of the second node, the mapped data being data obtained based on second to-be-processed data being mapped.

12. The data processing apparatus according to claim 11, wherein the processing code is further configured to cause at least one of the at least one processor to:
map the first to-be-processed data by using a first mapping rule to obtain first intermediate data;
acquire a public key of the second node, and encrypt an original random number by using the public key of the second node to obtain an encrypted random number corresponding to the first intermediate data; and
generate the first encrypted data according to the first intermediate data and the encrypted random number corresponding to the first intermediate data.

13. The data processing apparatus according to claim 12, wherein the processing code is further configured to cause at least one of the at least one processor to:
calculate original signature data according to the original random number and the first signature data, the original signature data matching data obtained based on the first intermediate data being signed using the private key of the second node; and
map the original signature data by using a second mapping rule, to obtain the first intersection data corresponding to the first signature data.

14. The data processing apparatus according to claim 9, wherein the processing code is further configured to cause at least one of the at least one processor to:
encrypt, based on an encryption algorithm, second intermediate data through a public key of the first node to obtain third encrypted data, the second intermediate data being obtained based on first to-be-processed data being mapped according to a third mapping rule;
transmit the third encrypted data to the second node; and
receive the first intersection data returned by the second node to obtain the first intersection set comprising the first intersection data, the first intersection data being obtained based on the third encrypted data being encrypted through a public key of the second node based on the encryption algorithm;
receive fourth encrypted data of the second node, the fourth encrypted data being obtained based on third intermediate data being encrypted through the public key of the second node based on the encryption algorithm, the third intermediate data being obtained based on second to-be-processed data of the second node being mapped through the third mapping rule; and
encrypt the fourth encrypted data through the public key of the first node to obtain the second intersection data, so as to obtain the second intersection set comprising the second intersection data;
wherein the encryption algorithm is a commutative encryption algorithm.

15. The data processing apparatus according to claim 9, wherein the processing code is further configured to cause at least one of the at least one processor to:
map and calculate, according to a fourth mapping rule, first to-be-processed data recorded by the first node to obtain the first intersection data;
map and calculate a plurality of pieces of first to-be-processed data of the first node respectively according to the fourth mapping rule, and obtain an oblivious polynomial about the first to-be-processed data according to mapping and calculation results, the oblivious polynomial taking the mapping and calculation results as roots;

perform coefficient encryption on the oblivious polynomial through a public key of the first node to obtain a coefficient encryption polynomial;

acquire an intermediate intersection set, the intermediate intersection set comprising a plurality of result values, one result value in the intermediate intersection set corresponding to one piece of second to-be-processed data of the second node, the result value being obtained in the following manner: substituting fourth intermediate data into the coefficient encryption polynomial to calculate an intermediate result value, and homomorphically calculating the intermediate result value through a homomorphic operation rule to obtain the result value, the fourth intermediate data being data obtained based on the second to-be-processed data of the second node being mapped and calculated according to the fourth mapping rule; and decrypt the result values in the intermediate intersection set through a private key of the first node to obtain the second intersection data.

16. The data processing apparatus according to claim 15, wherein the homomorphically calculating comprises:
   performing homomorphic scalar multiplication on the intermediate result value and a random number, and performing homomorphic addition with the fourth intermediate data corresponding to the intermediate result value to obtain the result value.

17. A non-transitory computer-readable storage medium, storing computer code that, when executed by at least one processor of a first node, causes the at least one processor to at least:
   acquire a first intersection set comprising N pieces of first intersection data, the first intersection data comprising a first plurality of user identifiers from raw data from a storage, and N being a positive integer;
   acquire a second intersection set comprising M pieces of second intersection data, the second intersection data comprising a second plurality of user identifiers received from a second node, and M being a positive integer;
   calculate an intersection between the first intersection set and the second intersection set to obtain an intersection result set that includes an intersecting portion of the first intersection data and the second intersection data;
   obfuscate the intersection result set to obtain an obfuscation set that comprises:
      obfuscated data based on data in the second intersection set, and
      an intersection data set based on the intersection result set,
   wherein the obfuscated data is not correlated with data in the intersection data set;
   generate a first training data set based on the obfuscation set, wherein the first training data set comprises a plurality of obfuscated user identifiers of the obfuscation set aligned with first user data;
   calculate a first gradient of the first training data set;
   transmit the obfuscation set to the second node, such that the raw data is not exposed to the second node, to cause the second node to calculate and transmit a second gradient to a third node;
   transmit the first gradient to the third node; and
   receive from the third node a total gradient based on the first gradient and the second gradient.

18. The non-transitory computer-readable storage medium according to claim 17, wherein the obfuscate comprises:
   selecting, from the second intersection set according to an obfuscation parameter, P pieces of second intersection data that does not belong to the intersection result as the obfuscated data, P being a positive integer; and
   adding the obfuscated data to the intersection result set to obtain the obfuscation set.

19. The non-transitory computer-readable storage medium according to claim 17, wherein the acquire the first intersection set comprises:
   acquiring first signature data, the first signature data being data obtained based on first encrypted data being signed using a private key of the second node, the first encrypted data being data obtained based on encryptings first to-be-processed data; and
   calculating the first intersection data corresponding to the first signature data according to the first signature data; and
   the acquiring the second intersection set comprises:
   acquiring the second intersection data, the second intersection data being data obtained based on second signature data being mapped, the second signature data being data obtained based on mapped data being signed using the private key of the second node, the mapped data being data obtained based on second to-be-processed data being mapped.

20. The non-transitory computer-readable storage medium according to claim 19, wherein the first encrypted data is obtained in the following manner:
   mapping the first to-be-processed data by using a first mapping rule to obtain first intermediate data;
   acquiring a public key of the second node, and encrypting an original random number by using the public key of the second node to obtain an encrypted random number corresponding to the first intermediate data; and
   generating the first encrypted data according to the first intermediate data and the encrypted random number corresponding to the first intermediate data.

* * * * *